United States Patent [19]
Kakuta et al.

[11] Patent Number: 5,636,356
[45] Date of Patent: Jun. 3, 1997

[54] DISK ARRAY WITH ORIGINAL DATA STORED IN ONE DISK DRIVE AND DUPLEXED DATA DISTRIBUTED AND STORED IN DIFFERENT DISK DRIVES

[75] Inventors: Hitoshi Kakuta, Tokyo; Toyohiko Kagimasa, Sagamihara; Yoshifumi Takamoto, Fuchu; Atsushi Tanaka, Kokubunji, all of Japan

[73] Assignee: Hitachi, Ltd., Tokyo, Japan

[21] Appl. No.: 117,685

[22] Filed: Sep. 8, 1993

[30] Foreign Application Priority Data

Sep. 9, 1992 [JP] Japan .................. 4-240333

[51] Int. Cl.⁶ .................................................. G06F 11/00
[52] U.S. Cl. .................................................. 395/441
[58] Field of Search .......................... 395/425, 441, 395/182.04

[56] References Cited

U.S. PATENT DOCUMENTS 5,313,585  5/1994  Jeffries et al. .................. 395/275
5,341,381  8/1994  Fuller ............................ 371/10.1
5,375,128  12/1994 Menon et al. .................... 371/40.1
5,408,644  4/1995  Schneider et al. ................ 395/575

FOREIGN PATENT DOCUMENTS 3-253933  11/1991  Japan .

OTHER PUBLICATIONS

Merchant et al., "Design and Modeling of Clustered RAID," Jul. 1992, pp. 140–149.
"A Case for Redundant Arrays of Inexpensive Disks (RAID)", D. Patternson et al, ACM SIGMOD Conference, Jun. 1988, pp. 109–116.

Primary Examiner—David L. Robertson
Attorney, Agent, or Firm—Fay, Sharpe, Beall, Fagan, Minnich & McKee

[57] ABSTRACT

A drive unit connected to a disk control unit of a disk array has a logical group formed of a plurality of drives. In the logical group, both original data and duplexed data of the original data are stored. The original data and the duplexed data thereof are stored in different drives. When a plurality of data stored in one drive are to be read, the original data or the duplexed data thereof are read in parallel from the different drives.

35 Claims, 21 Drawing Sheets

FIG. 18 PRIOR ART

| | DATA 1 | DATA 1 | DATA 1 | PARITY |
|---|---|---|---|---|
| | 1 | 0 | 1 | 1 |
| | 0 | 0 | 1 | 0 |
| | 0 | 1 | 1 | 1 |
| | 1 | 0 | 0 | 0 |
| | 0 | 1 | 1 | 1 |
| | 1 | 1 | 0 | 1 |
| | 1 | 0 | 0 | 1 |
| | 0 | 1 | 1 | 1 |
| | ⋮ | ⋮ | ⋮ | ⋮ |
| 8 | 1 | 0 | 0 | 0 |
| 7 | 1 | 0 | 1 | 1 |
| 6 | 0 | 1 | 0 | 0 |
| 5 | 1 | 0 | 0 | 0 |
| 4 | 0 | 0 | 1 | 0 |
| 3 | 1 | 0 | 1 | 1 |
| 2 | 0 | 0 | 0 | 1 |
| #1 | 1 | 1 | 1 | 0 |
| | Drive #1 | Drive #2 | Drive #3 | Drive #4 |

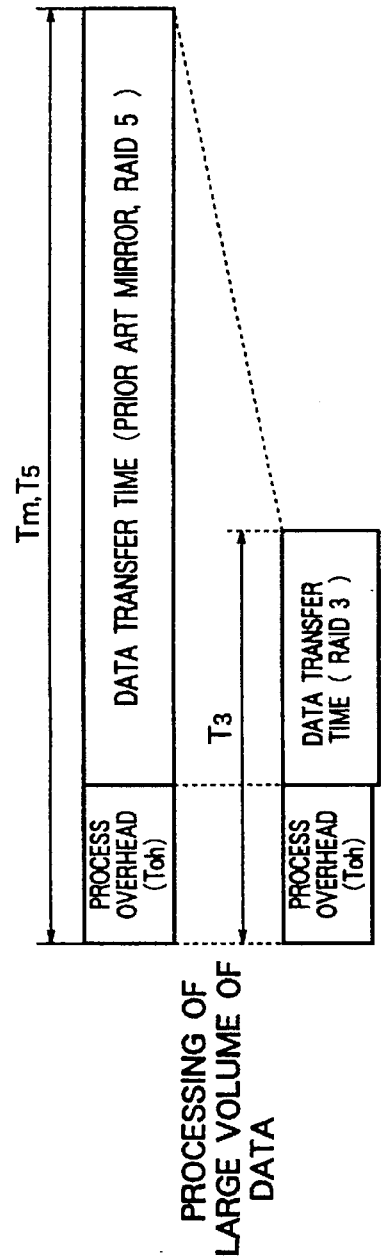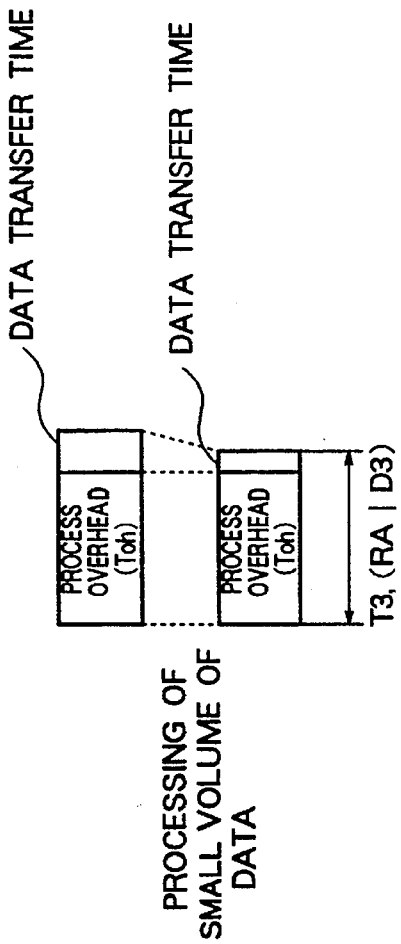

FIG. 20

| DATA NAME | ORIGINAL DATA ADDRESS | | | DUPLEXED DATA ADDRESS | | |
|---|---|---|---|---|---|---|
| | DRIVE NUMBER | (CAddr, HAddr) | Write flag | DRIVE NUMBER | (CAddr, HAddr) | Write flag |
| DATA #1 | Drive #1 | (1,1) | 1 | Drive #1 | (1,1) | 0 |
| DATA #1 | Drive #1 | (1,2) | 1 | Drive #1 | (1,2) | 1 |
| DATA #1 | Drive #1 | (1,3) | 1 | Drive #1 | (1,3) | 1 |
| DATA #1 | Drive #2 | (1,1) | 0 | Drive #1 | (1,1) | 0 |
| DATA #1 | Drive #2 | (1,2) | 1 | Drive #1 | (1,2) | 1 |
| DATA #1 | Drive #2 | (1,3) | 0 | Drive #1 | (1,3) | 1 |
| DATA #1 | Drive #3 | (1,1) | 1 | Drive #1 | (1,1) | 1 |
| DATA #1 | Drive #3 | (1,2) | 1 | Drive #1 | (1,2) | 1 |
| DATA #1 | Drive #4 | (1,1) | 1 | Drive #1 | (1,1) | 0 |
| DATA #1 | Drive #4 | (1,2) | 1 | Drive #1 | (1,2) | 1 |
| DATA #1 | Drive #4 | (1,3) | 0 | Drive #1 | (1,3) | 1 |
| ......... | ......... | ......... | ......... | ......... | ......... | ......... |

(CAddr, HAddr) : (CYLINDER ADDRESS, HEAD ADDRESS)

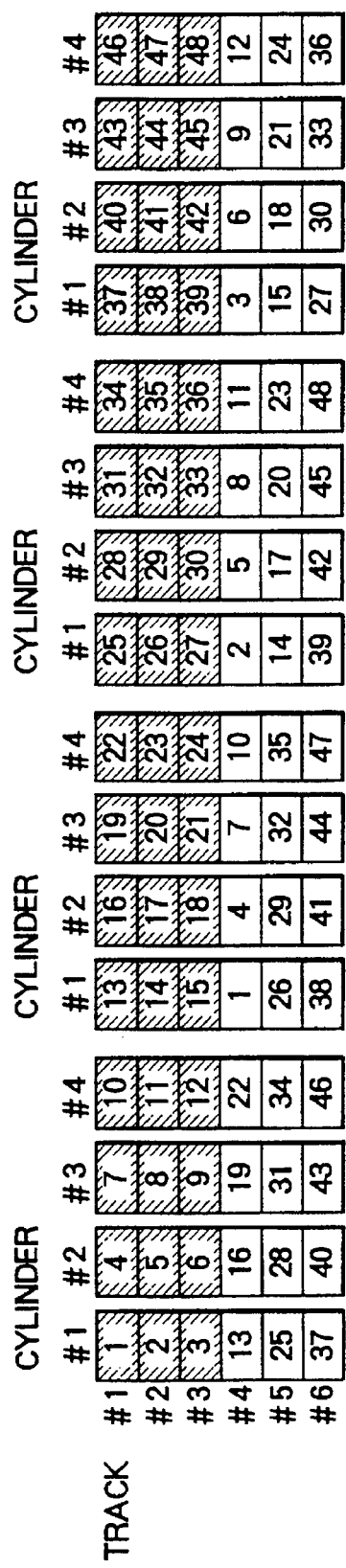
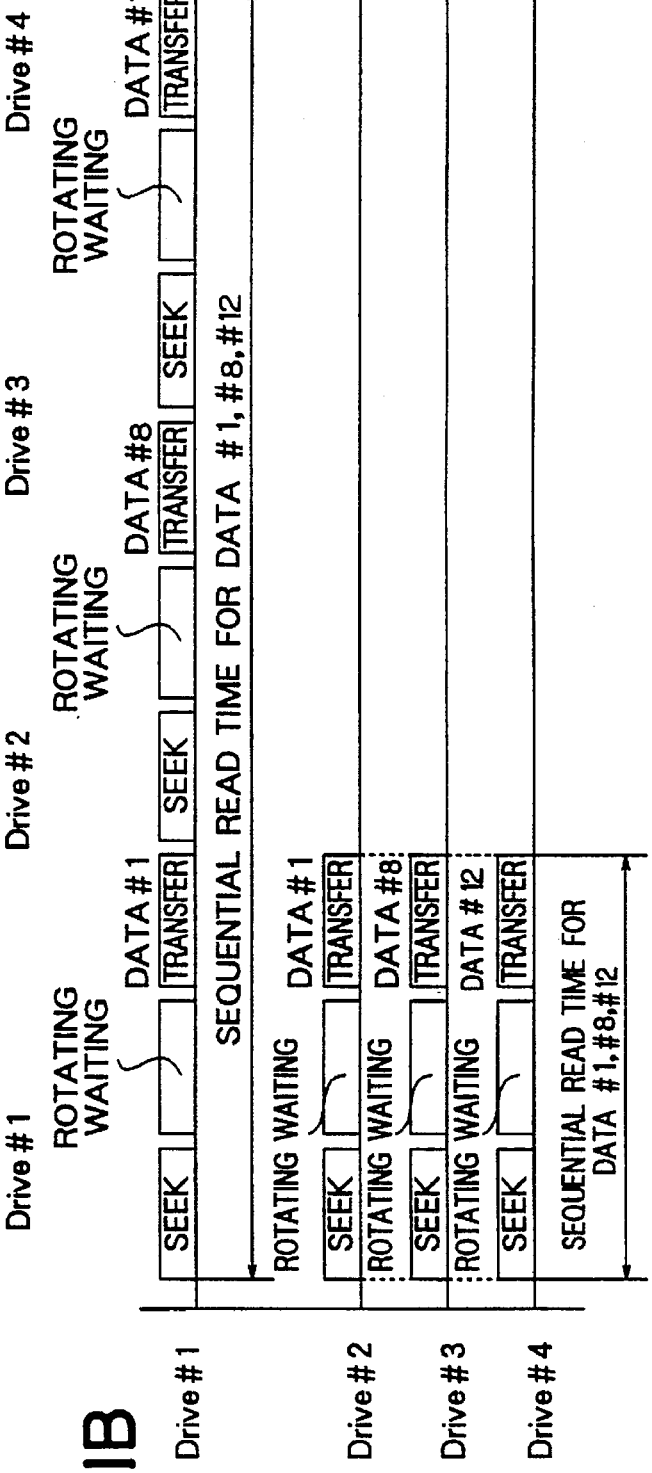
FIG. 21A
FIG. 21B

DISK ARRAY WITH ORIGINAL DATA STORED IN ONE DISK DRIVE AND DUPLEXED DATA DISTRIBUTED AND STORED IN DIFFERENT DISK DRIVES

BACKGROUND OF THE INVENTION

The present invention relates to a disk array system which stores a plurality of data in duplex.

Presently, in an information processing apparatus such as a computer, data required by a host device such as a central processing unit (CPU) is stored in a secondary memory and the data is read/written in response to a request from the CPU. Such a secondary memory usually uses a non-volatile memory medium, as represented for example by a magnetic disk drive or an optical disk drive.

As the information integration proceeds, an improvement of a performance characteristic such as processing speed of the secondary memory or an improvement in reliability has been desired. In order to meet such a requirement, a disk array system comprising a plurality of disk drives (hereinafter referred to as drives) of a relatively small capacity has been proposed.

Disk array systems are classified into several types depending on their methods for storing data.

FIG. 16A shows a method of storing data by using mirror disks.

In the disk array system which uses the mirror disks, identical data is stored in two drives in the same manner. In FIG. 16A, drive #1 and a drive #2 are paired and a drive #3 and a drive #4 are paired, and one logical group is configured by the two pairs of mirror disks. In such an array disk system, the same data is stored in the drives of each pair. Thus, if a fault occurs in the drive #1 and the data stored therein cannot be read out, the data may be read from the drive #2 so that the access to the data stored in the drive #1 is enabled. If a fault occurs in the drive #2, the data may be read from the drive #1 so that the access to the data store in the drive #2 is enabled. In this manner, in the pair of drives #1 and #2, one of the data is backup data to enhance the resistance to the drive fault. The same is true for the pair of the drives #3 and #4.

FIG. 16B shows a disk array system of a type (RAID3) in which one data transferred from the CPU is divided into three and the divided data are parallelly stored in a plurality of drives #1 to #3. In this disk array system, when the recovered data is to be read out, the divided data stored in the respective drives are simultaneously read as opposed to the storing of the data, and the read data are assembled to reproduce the original data, which is transferred to the CPU. The parallel reading of the data from the plurality of drives or the writing thereof is hereinafter referred to as parallel processing. In the parallel processing of the plurality of drives, the rotation of the disks which are recording media is synchronized for each group of drives for the parallel processing so that the data is read and/or written for the same address for the drives in the group. Thus, the plurality of drives perform the same operation. In the disk array system in which the data is divided for the parallel processing, an error correction code (ECC) is prepared based on the divided data in order to enhance the reliability and a drive #4 for exclusively storing the ECC is provided. When the ECC is an odd parity, a parity is set such that the number of "1" bits for lateral bits is odd for the data stored in each drive. For example, as shown in FIG. 18, it is assumed that for a row #7 the data bits of the drives #1 and #3 are "1" and the data bit of the drive #2 is "0". In this case, the parity is "1". If a fault occurs in the drive #1 (same for the drive #2 or #3) and the data cannot be read therefrom, the data of the drive #1 may be recovered from the data of the drives #2 and #3 and the parity of the drive #4.

In a third type (RAID5) of the array disk system shown in FIGS. 17A and 17B, data is not divided but stored in one of the drives and the respective data are handled independently. In such a disk array system, an ECC is also prepared in order to enhance the reliability. The ECC is prepared for a group of data in a row as shown in FIGS. 17A and 17B. In this disk array system, a drive for exclusively storing the ECC is not provided but the ECC is stored together with the data in the respective drives. If a fault occurs in the drive #1 (same for the drive #2, #3 or #4), the data in the drive #1 can be recovered from the data and the parity stored in the drives #2, #3 and #4.

A representative article for such a disk array system is "A Case for Redundant Arrays of Inexpensive Disks (RAID)" by D. Patterson, G. Gibson and R. H. Kartz, ACM SIGMOD Conference, Chicago, Ill. (June 1988) pages 109–116. In this article, the discussion of the performance and reliability of the disk array systems is reported. The mirror system described first is discussed in the article as a first level RAID, the parallel processing system of the divided data described secondly is discussed as a third level RAID (hereinafter RAID3), and the data distribution and parity distribution system described thirdly is discussed as a fifth level RAID (hereinafter RAID5). It is presently considered that the disk array systems described in this article are the most common disk array systems.

In the prior art disk array system of the mirror type (FIG. 16A), when a large volume of data such as data #1 to #12 are to be transferred to a cache memory, the data is normally sequentially read from the drive #1 or #2 in the order of #1, #2, #3, #4, . . . #12 and they are transferred to the cache memory. A data processing time Tm is given by $$Tm=D/(S\times 1000)+Toh(s)$$

where D (KB) is a volume of data to be transferred to the cache memory, S (MB/s) is a transfer rate and Toh is an overhead of the processing. Tm is equal to a time to normally process data in one drive. As a result, a high speed transfer is not expected. In the normal accessing to read/write a small volume of data between the CPU and the drive, the access performance (a maximum number of read/write items per unit time) allows to accept up to four requests in parallel by four drives for reading and to accept up to two requests by two pairs of two drives for writing. Thus, the performance to transfer a large volume of data at a high speed is low but the normal read/write processing performance between the CPU and the drive is high.

On the other hand, in the prior art disk array system of the type RAID3 (FIG. 16B), the data is divided and stored in the drives #1 to #3 and the read/write of the data is always simultaneously done for the four (including one parity drive) drives. As a result, the data in each drive does not make sense and one complete data is not attained unless all data of the drives #1 to #3 are acquired. In this case, the transfer rate is 3×S (MB/s) and a data processing time T3 is given by $$T3=D/(S\times 1000\times \#)+Toh=Tm/3(s)$$

where D (KB) is a volume of data to be transferred to the cache memory and Toh is an overhead. In the RAID3, the parallel processing is performed and when a large volume of data is to be transferred, Toh may be ignored as shown in FIG. 19A. The data transfer time is approximately ⅓ of that in processing data by one drive in the prior art mirror system (FIG. 16A). Accordingly, it is effective when a large volume of data is to be sequentially transferred to the cache memory at a high speed.

However, when the CPU is to make normal read/write to the drive, the data storage area is random, the data is of small volume and the request is frequently issued. In the RAID3, since the drives #1 to #4 are simultaneously accessed for one data, only one read/write request may be accepted at a time although there are four drives. Although the transfer speed is improved by the parallel processing, it is not very effective because the occupation ratio of the overhead in the data processing time is large when the data volume is small. As a result, much improvement of the performance in the normal read/write operation between the CPU and the drive cannot be expected.

In the disk array system of the RAID5, as shown in FIG. 17A, where blocks of data are stored for each drive (for example, data #1, #2, #3, #4, #5, #6, #7, #8 and #9 for the drive #1) and the data are to be sequentially transferred to the cache memory starting from the data #1, a series of data are read from the drive #1 and they are transferred to the cache memory. Thus, the time required for the data processing is equal to the time required to process the data by one drive, as it is in the prior art mirror system. However, when the entirety of the data of the logical group are to be read and/or written, high speed transfer may be attained by parallelly processing the drives #1, #2, #3 and #4.

On the other hand, as shown in FIG. 17B, where the blocks of data (data #1, #2, #3, #4, #5, #6, #7, #8 and #9) are stored across the drives and the data are to be sequentially processed, the data from the drives #1, #2, #3 and #4 are parallelly processed as they are in the RAID3 and they are transferred to the cache memory. Accordingly, in this case, if the volume of data is large, the processing time is approximately one third of the prior art mirror system in which the data is processed by one drive, as it is in the RAID3. This method of storing the data in the RAID5 is effective when a large volume of data is to be sequentially transferred to the cache memory at a high speed.

In the RAID5, when a small volume of data is to be read and/or written randomly between the CPU and the drive, up to four read requests and up to two write requests may be simultaneously accepted with four drives whether the data is stored in the manner shown in FIG. 17A or FIG. 17B, as they can in the prior art mirror system. However, when the data is to be written in the RAID5, a large overhead is required for the modification of the parity. For example, in FIG. 17A, when the data #10 of the drive #2 is to be updated (or in FIG. 17B, when the data #2 is to be updated), the data #10 and the parity of the drive #4 are read. A waiting time of one half revolution, on average, is required for the reading. A new parity is prepared based on the read data #10 and parity and the data #10 to be newly written, and the data #10 to be newly written and the newly prepared parity are written into the drives #2 and #4, respectively. At this time, a waiting time of one more revolution is required. Thus, a waiting time of at least one and a half revolution is required for the writing. In the prior art mirror system and the RAID3, the revolution waiting time for the read/write processing is one half revolution on average. The rotation of the disk is a mechanical overhead which is much larger than other electrical overhead. As a result, the disk revolution waiting time in the write processing is a very large overhead which causes a significant reduction in the performance when a small volume of random data is to be processed. Accordingly, in the RAID5, where the data is stored as shown in FIG. 17B, the performance to transfer the large volume of data at a high speed is high but the process performance is lowered when the write requests increase in the normal read/write processing between the CPU and the drive.

As discussed above, in the prior art mirror system, the RAID3 and the RAID5, it is not possible to be consistent with the requirement of high speed transfer of the large volume of data between the semiconductor memory and the drive and the requirement of the improvement of the normal read/write performance between the CPU and the drive.

SUMMARY OF THE INVENTION

It is an object of the present invention to provide a disk array system which solves the above problems.

In order to achieve the above object, in accordance with the present invention, there is provided a disk array comprising:

(a) a plurality (m; m≧3) of disk drives; and (b) a disk control unit for controlling writing of data to said disk drives and reading of data from said disk drives;

said disk control unit including;

(b1) means for determining a plurality of area pairs each including an area for original data and an area for duplexed data of the original data, among a plurality of areas included in said plurality of disk drives, said area pairs being determined such that an area for original data and an area for duplexed data both belonging to the same area pair belong to different disk drives, and such that a plurality of areas each belonging to one of the area pairs to which a plurality of areas belonging to the same one of the disk drives belong, are distributed to a predetermined number (n) (where 2≦n≦m−1) of disk drives other than that one disk drive;

(b2) means for writing data to be written into said plurality of disk drives both into one area for original data and another area for duplexed data belonging to the same area pair among said plurality of area pairs as determined, respectively;

(b3) means for detecting, as data read areas, a plurality of areas which belong to different disk drives and which hold different ones of a plurality of and more than two data to be read from said plurality of disk drives, as original data or duplexed data; and (b4) means for parallelly reading the plurality of data from the plurality of detected areas.

BRIEF DESCRIPTION OF THE DRAWINGS

FIG. 18 illustrates a method for preparing a parity in the prior art disk array system;

FIG. 19A shows a comparison of data processing times in the transfer of a large volume of data in the prior art technique;

FIG. 19B shows a comparison of data processing times in the transfer of a small volume of data in the prior art technique;

FIG. 20 is a diagram showing an example of an address translation table for use in the system shown in FIG. 2; and FIGS. 21A and 21B are diagrams for explaining a data stored state by the fourth data store method applied to the system shown in FIG. 1.

DETAILED DESCRIPTION OF THE PREFERRED EMBODIMENTS

The present invention will now be described with reference to the drawings.

Embodiment 1

Figure 1:
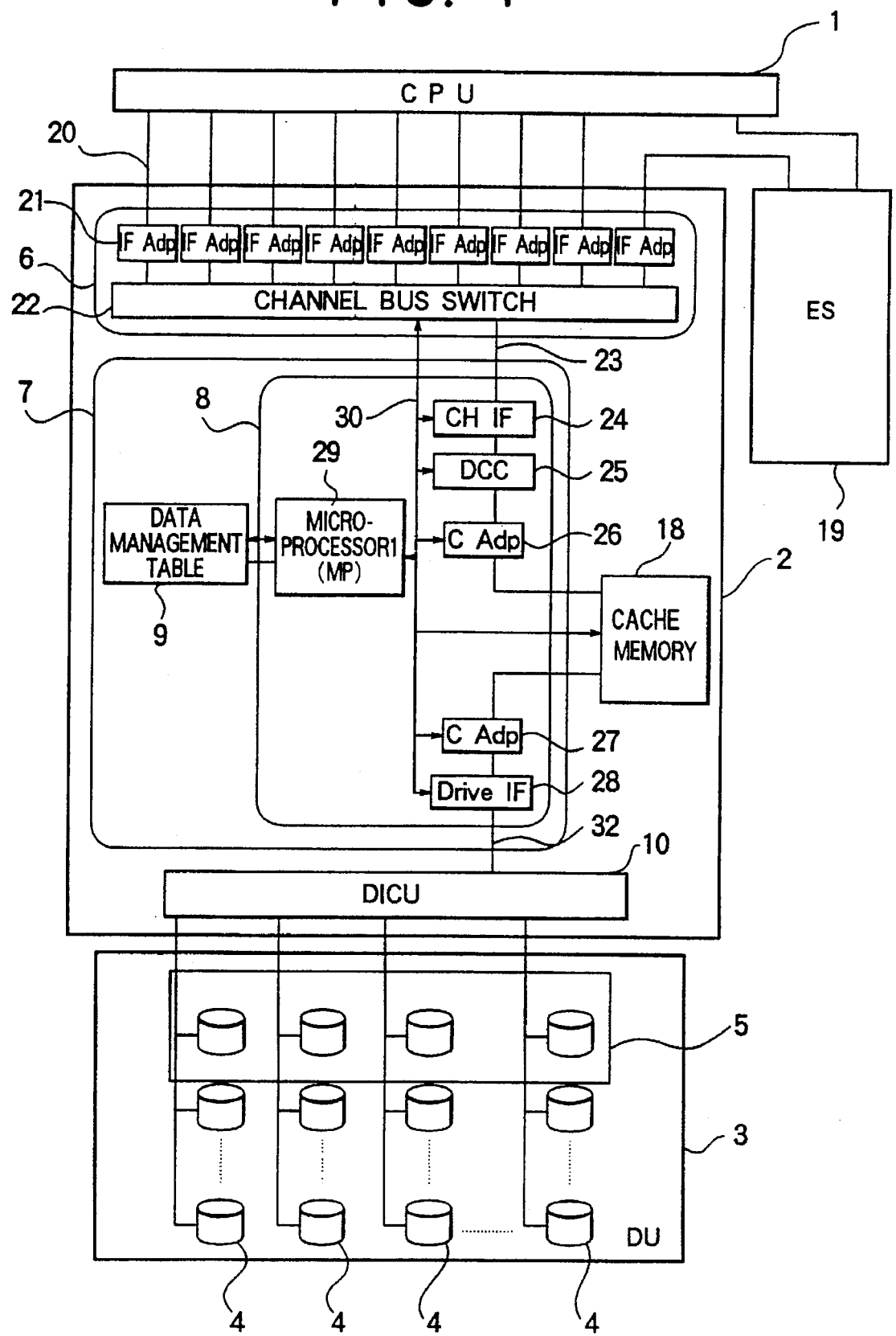
FIG. 1 shows a configuration of a disk array system of the present invention.

FIG. 1 shows a configuration of an embodiment of a duplexed disk array system of the present invention.

A disk controller (hereinafter DKC) 2 is connected to a CPU 1 and to a drive unit (hereinafter DU) 3 comprising a plurality of drives 4. The DKC 2 comprises a channel I/F control unit (hereinafter CICU) 6 which controls interface (I/F) between the CPU 1 and an extended storage (ES) 19, a data control unit (DCU) 7 which controls read/write of data to a drive 4 in the DU 3 and a drive I/F control unit (hereinafter DICU) 10 which controls interface between the drive 4 and the DKC 2. The DU 3 comprises one or a plurality of logical groups 5 each comprising two or more drives 4. Both of original data and duplexed data are stored in the logical group 5, and original data and the duplexed data thereof are stored in different drives 4.

Figure 2:
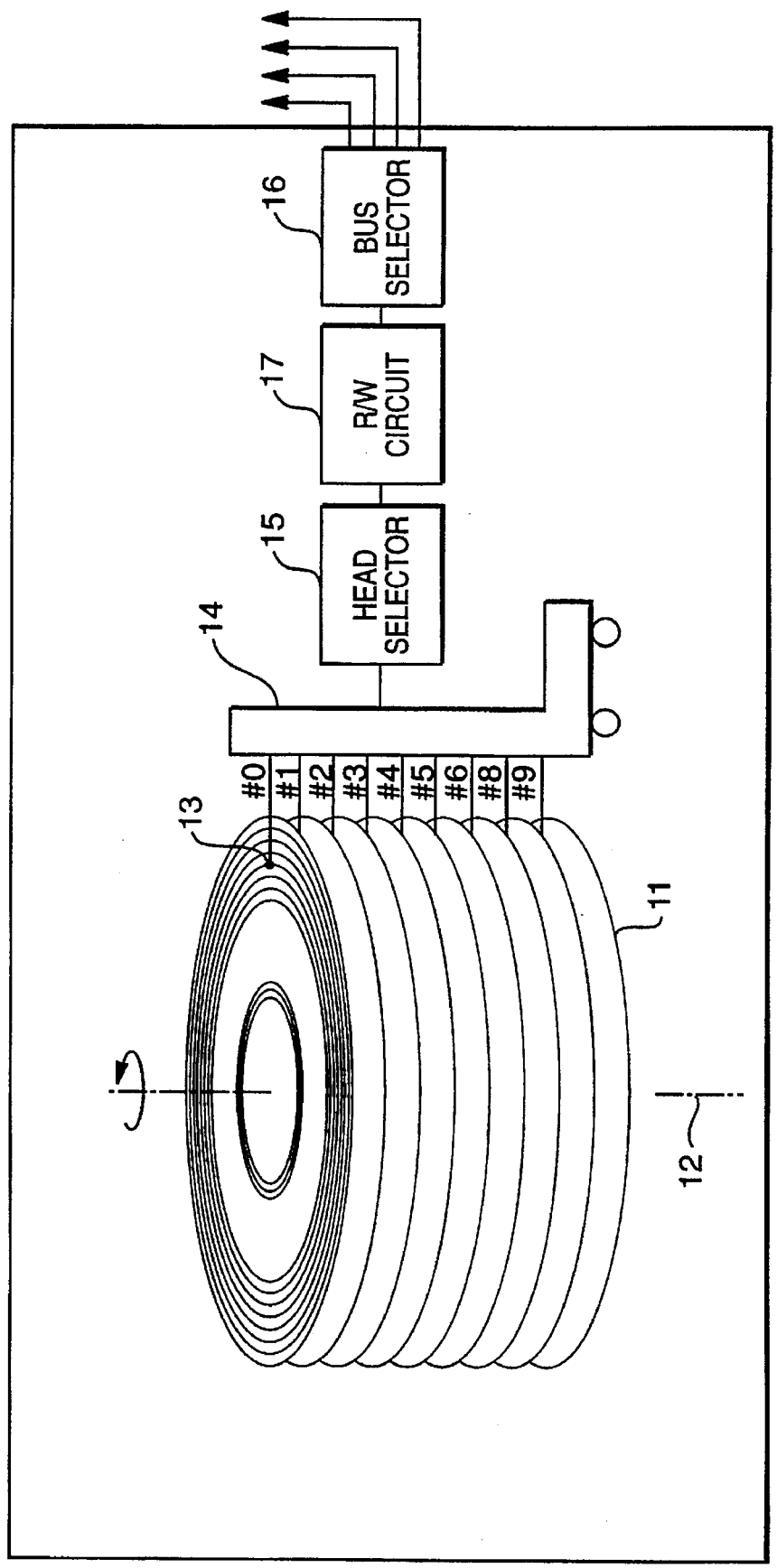
FIG. 2 shows an internal structure of a drive used in the system of FIG. 1.

An internal structure of the drive 4 is shown in FIG. 2. A plurality of disks 11 for recording data are arranged to be rotated about an axis of rotation 12 and data is read from or written into a disk 11 by a head 13. At least one head 13 is required for one surface of each disk 11 and all heads 13 are simultaneously positioned to the disks 11 by an actuator 14. In the drive 4, data is stored on concentric tracks on the disk surface. An aggregation of tracks which can be read and/or written by one head positioning is called a cylinder. Cylinder addresses are imparted to the tracks on the disk surface from an outer periphery to an inner periphery. When data is to be read or written, the address at which the data is stored or to be stored is specified by the CPU and accessed. Specifically, the CPU 1 issues a read or write command by specifying an interdrive address which comprises a set of a head number for selecting the head 13 and a cylinder address, the head number corresponding to the head address in the specified address is selected by a head selector 15, and the head 13 is sent by the actuator 14 to the track corresponding to the cylinder address. When the access to the address at which the data is stored or to be stored is completed, a bus to a host system is selected by a bus selector 16 and the data on the disk 11 is read or written by a R/W circuit 17.

The CICU 6 and the DCU 7 in the DKC 2 are now explained with reference to FIG. 1.

The CICU adaptor 6 comprises a plurality of interface adapters (hereinafter IF ADP) 21 and a channel bus switch 22. The CICU 6 switches an external bus 20 between the CPU 1 and the DKC 2 to connect the CPU 1 and the DKC 2. More specifically, in the read mode, it selects the external bus 20 connected to the CPU 1 by the channel bus switch 22 and transfers the data from a cache memory 18 to the CPU 1 by the IF ADP 21 through the external bus 20. In the write mode, it selects the external bus connected to the CPU 1 by the channel bus switch 22, transfers the data from the CPU 1 to the IF ADP 21 through the external bus 20 and stores it in the cache memory 18.

The DCU 7 comprises a data control unit 8 and a data management table 9. The data control unit 8 comprises a microprocessor (MP) 29 for controlling the data processing in the DKC 2, a channel interface circuit (CH IF) 24, a data controller (DCC) 25, a channel cache adaptor (C ADP) 26, a drive cache adaptor (C ADP) 27 and a drive interface circuit (DRIVE IF) 28. The CH IF 24 performs the conversion between the channel interface protocol in the CPU 1 and the processing in the DKC 2, and the coordination of the processing speeds of the channel interface and the DKC 2. More specifically, where the channel interface between the CPU 1 and the DKC 2 is an optical interface, it performs the conversion between the optical interface protocol and the protocol for the electrical processing in the DKC 2. The DCC 25 controls the data transfer in the DKC 2 under the command from the MP 29. The C ADP 26 is a circuit which reads or writes data for the cache memory 18 under the command from the MP 29 and is an exclusive control circuit for the request of monitoring the status of the cache memory 18 and the read and write requests. The data read from the cache memory 18 by the C ADP 26 is transferred to the CH IF 24 under the control of the DCC 25, and the data transferred from the CH IF 24 is transferred to the C ADP 26 under the control of the DCC 25 and stored in the cache memory by the C ADP 26. The drive C ADP 27 is a circuit which, like the channel C ADP 26, reads and writes data for the cache memory 18 under the command from the MP 29 and exclusively controls, together with the C ADP 26, the monitoring of the status of the cache memory 18 and the read and write requests. The DRIVE IF 28 issues a read or write command to the drive under the command of the MP 29.

The data control unit 8 described above has a sufficient processing performance to simultaneously process a plurality of drives 4 in the DU 3.

The DCU 7 in the DKC 2 is now explained in detail.

The following description will be made by selecting 4 for the number m of drives 4. In general, however, m may be any integer equal to or larger than 3.

The DCU 7 comprises the data control unit 8 and the data management table 9. The microprocessor (MP) 29 of the data control unit 8 references the data management table 9 to recognize the interdrive address of the data in the DU 3 and control the read/write of the data for the corresponding drive 4 in the DU 3. In duplex control of the present embodiment, the CPU 1 recognizes only the original data and the DKC 2 independently stores the duplexed data at the address corresponding to the address at which the original data is stored, in accordance with a rule described below. A similar table to that owned by the DCU 7 may be provided in the CPU 1 and the table may be referenced from the OS to control the read/write of the data for the drive 4 to attain the duplex control by the CPU 1. The data management table 9 is formed as a table of addresses at which the original data and the duplexed data are stored, and it stores drive numbers, cylinder addresses and head addresses corresponding to the requested data. In the present embodiment, a data name is called also as an area name in the following description.

In the present embodiment, in the logical group 5, an area capable of storing 12 data is defined as a group because one logical group 5 comprises four drives 4. Where the number of drives forming the logical group is changed, the number of data in the group changes as follows. Namely, where the number of drives forming the logical group 5 is m, one group comprises an area capable of storing (m−1)×M data and the duplexed data thereof. There is no specific restriction on the unit of data although one track capacity is used as the unit of data in the following description. It is also possible that a track is comprised of a plurality of discrete data, and the original data and the duplexed data are collected on a track basis so that they can be allocated to the areas in accordance with the storing rule. Accordingly, it is apparent that the management on a track basis simplifies management as compared with the management on a data basis.

The data is stored in the DU 3 in the following manner.

In each drive 4 in the group, an area capable of storing data equal in number to the number of the drives 4 forming the logical group 5 less one is defined as a sub-group. Where twelve data #1 to #12 are to be stored in the group 1, three data are stored in each of four sub-groups. For example, the data #1, #2 and #3 are stored in the sub-group of the drive #1, the data #4, #5 and #6 are stored in the sub-group of the drive #2, the data #7, #8 and #9 are stored in the sub-group of the drive #3, and the data #10, #11 and #12 are stored in the sub-group of the drive #4. The data #1 to #12 are arranged as shown in FIG. 4.

An address management method for the data arranged in the sub-groups in the group is described below. In the present embodiment, a cylinder group is formed by cylinders having the same cylinder addresses in each drive 4 of the logical group 5.

Figure 4:
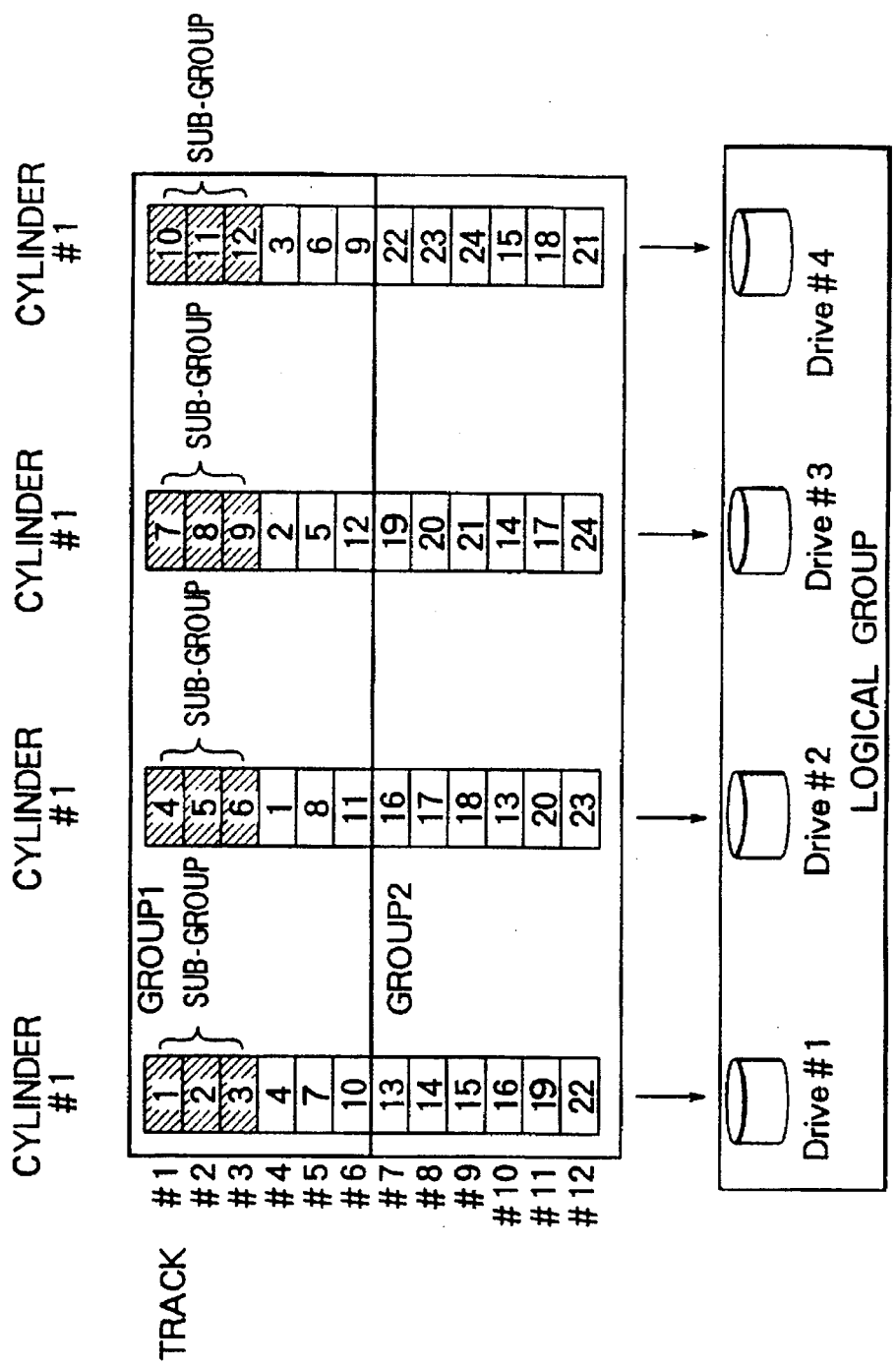
FIG. 4 shows the storing of duplexed data in the system of FIG. 1.

FIG. 4 shows data arranged in the cylinder #1 in each drive 4 of the logical group 5. In the present embodiment, each cylinder consists of 12 tracks #1 to #12 (head addresses #1 to #12).

The group 1 consists of the tracks #1, #2, #3, #4, #5 and #6 (head addresses #1, #2, #3, #4, #5 and #6) of the cylinder #1 of each drive 4.

The group 2 consists of the tracks #7, #8, #9, #10, #11 and #12 (head addresses #7, #8, #9, #10, #11 and #12) of the cylinder #1 of each drive 4.

In the group 1, the sub-group consists of the tracks #1, #2 and #3 (head addresses #1, #2 and #3) of the cylinder #1 of the drives #1, #2 and #3, and in the group 2, the sub-group consists of the tracks #7, #8 and #9 (head address #7, #8 and #9) of the cylinder #1 of the drives #1, #2 and #3.

Figure 3:
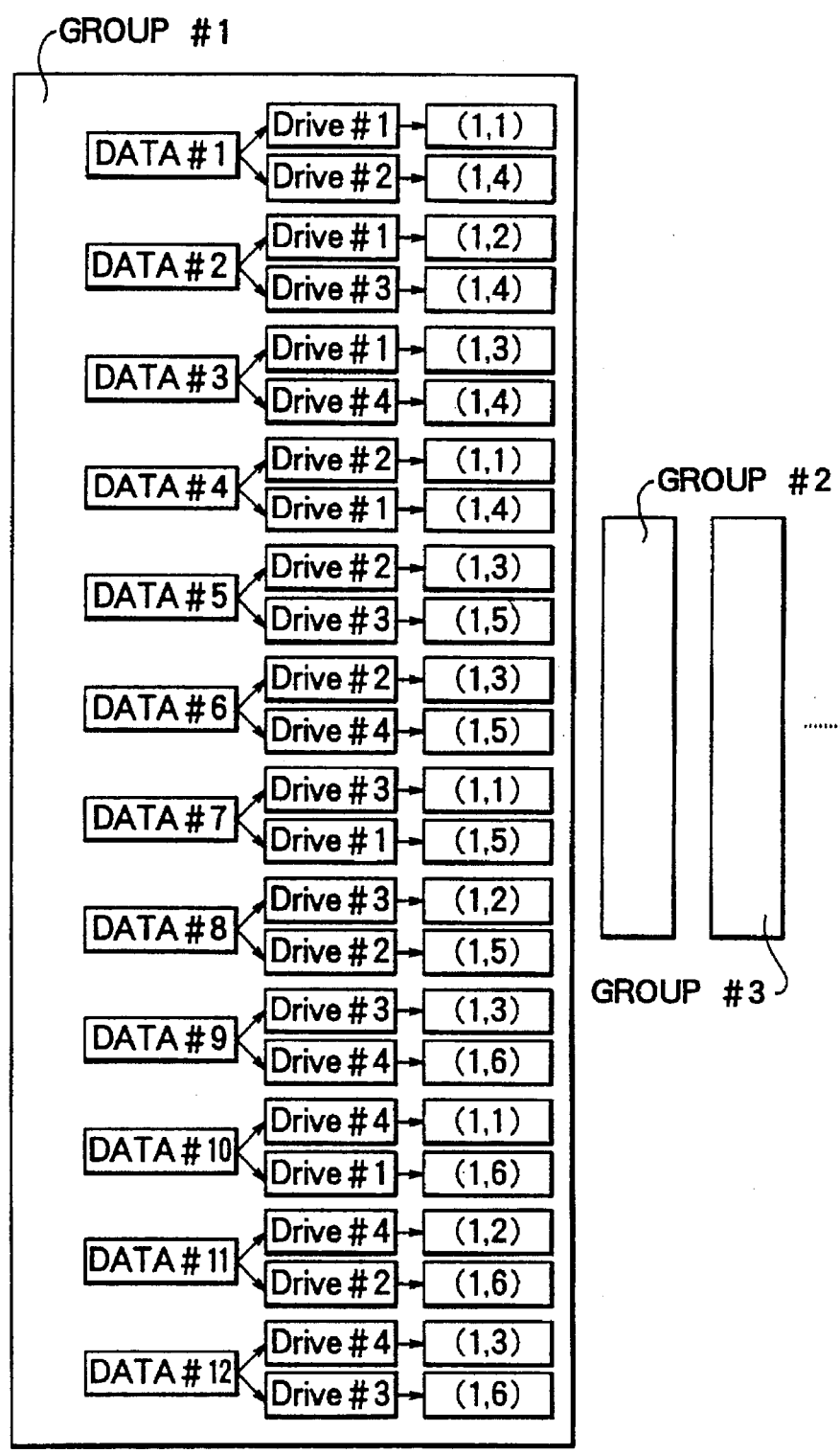
FIG. 3 illustrates a method for storing data of FIG. 1 to be applied to the system of FIG. 1.

In the present embodiment, each data is duplexed at an address (i,j) defined by a cylinder address i and a head address j in two different drives as shown in FIG. 3 based on the data management table 9, and is stored in each drive as shown in FIG. 4. The data #1 is stored at the address of the cylinder address #1 and the head address #1 (hereinafter shown by (cylinder address, head address)) of the drive #1, and the duplexed data thereof is stored at the address (1, 4) of the drive #2, the data #2 is stored at the address (1, 2) of the drive #1 and the duplexed data thereof is stored at the address (1, 4) of the drive #3. The data #3, #4, #5, . . . are stored in a similar manner in accordance with the rule shown in FIG. 4.

In this manner, basically, the duplexed data is distributedly stored in a drive 4 other than the drive 4 in which the original data is stored in the aggregation of the drives 4 of the logical group 5. Namely, the duplexed data of the data #1, #2 and #3 stored in the drive #1 are stored in any of the drives #2, #3 and #4 other than the drive #1. In the present embodiment, the data #1 is stored in the drive #2, the data #2 is stored in the drive #3 and the data #3 is stored in the drive #4. Similarly, the data #4, #5 and #6 are stored in the drives #1, #3 and #4, respectively, the data #7, #8 and #9 are stored in the drives #1, #2 and #4, respectively, and the data #10, #11 and #12 are stored in the drives #1, #2 and #3, respectively. Where the logical group 5 comprises four drives 4, the duplexed data for the original data of the drives #1 is allocated to the drive 4 (drive #2, #3 or #4) other than the drive #1 of the logical group 5. The duplexed data for the original data of the drive #2 is allocated to the drive 4 (drive #1, #3 or #4) other than the drive #2 of the logical group 5. The duplexed data for the original data of the drive #3 is allocated to the drive 4 (#1, #2 or #4) other than the drive #3 of the logical group 5. The duplexed data for the original data of the drive #4 is allocated to the drive 4 (drive #1, #2 or #3) other than the drive #4 of the logical group 5.

After the original data and the duplexed data have been stored in this manner and the drives have been allocated, the addresses (cylinder address and head address) in each drive are allocated in the following manner. In the present embodiment, the duplexed data for the original data belonging to the same sub-group is assigned with the same cylinder address as that of the original data, because, in the present embodiment, the group consists of the same cylinder in each of the drives 4 of the logical group 5. If the original data and the duplexed data are allocated to random cylinder addresses and the group consists of those addresses, a head seek operation is required in the parallel processing by a plurality of drives in a high speed transfer to be described later, and the performance is lowered. On the other hand, the head addresses are the same. In allocating to the same head address in the cylinder, if an area preceding to that address is vacant, the blank area is filled in first, at the beginning of the allocation sequence for each sub-group. Specifically, in FIG. 4, the duplexed data for the data #4 which is the original data of the drive #2 is allocated to the track #4 because the track #4 is vacant in the cylinder #1 of the drive #1.

In the present embodiment, the aggregation of the tracks in which the original data are stored (the tracks #1, #2 and #3 in the group 1) and the aggregation of the tracks in which the duplexed data are stored (the tracks #4, #5 and #6 in the group 1) are separated and the same head addresses are used, although they may be mixedly arranged, in which case, however, frequent switching of the heads in the high speed transfer to be described later is required, and the control and the management of the addresses are complex. Accordingly, where the data are to be mixedly arranged, the data are to be mixedly arranged within the aggregation of the tracks in which the original data are stored and the aggregation of the tracks in which the duplexed data are stored.

In allocating the areas of the drives to the original data and the duplexed data, a rule is followed wherein $2m(m-1)$ ($=((2m-1)$ areas of each drive$)\times(m$ drives$))$ are grouped and to provide for $m(m-1)$ original data areas and an equal number of duplexed data areas.

In the present embodiment, when the number of drives is m, the number m of divisions of the duplexed data for the $(m-1)$ original data in the same drive is equal to $(m-1)$, and they are distributedly stored in the $(m-1)$ drives. Accordingly, m data may be parallelly read from m drives at maximum.

The data #1 to #12 of the group 1 are stored in the drives 4 in accordance with the rule described above. The groups 2 et seq are similarly grouped and the data are stored in each group in accordance with the rule shown in FIG. 4. The data management table 9 has a relational table as shown in FIG. 3 to store the data in accordance with the above rule. As shown in FIG. 20, the data management table 9 contains addresses at which the original data are stored and addresses at which the duplexed data allocated to the addresses at which the original data are stored are stored, for the stored data names. At the initial setting, the address management table 9 contains only the original data addresses and the duplexed data addresses and has a vacant area. As data are sequentially stored, data names are registered in the address management table 9. When the stored data is deleted, the data name registered in the address management table 9 is deleted and the original data addresses and the duplexed data addresses remain as they are. In this manner, when the data are to be stored, the data name is registered in the vacant area, and the address at which the original data is to be stored and the address at which the duplexed data is to be stored are automatically determined. In the DCU 7, the MP 29 of the data control unit 8 references the data management table 9 based on the address of the original data specified by the CPU 1 to read and write for the drives 4 in which the original data and the duplexed data are stored.

A method for reading and writing the stored data is now explained.

The reading of the data from the drive 4 is first described.

In the DKC 2, MP 29 of the DCU 7 references the data management table 9 to determine the drive in which the data specified by the CPU 1 is stored and the cylinder address and the head address in the drive. The method for reading the data from the drive by the MP 29 of the DCU 7 includes the following three major methods.

Figure 5:
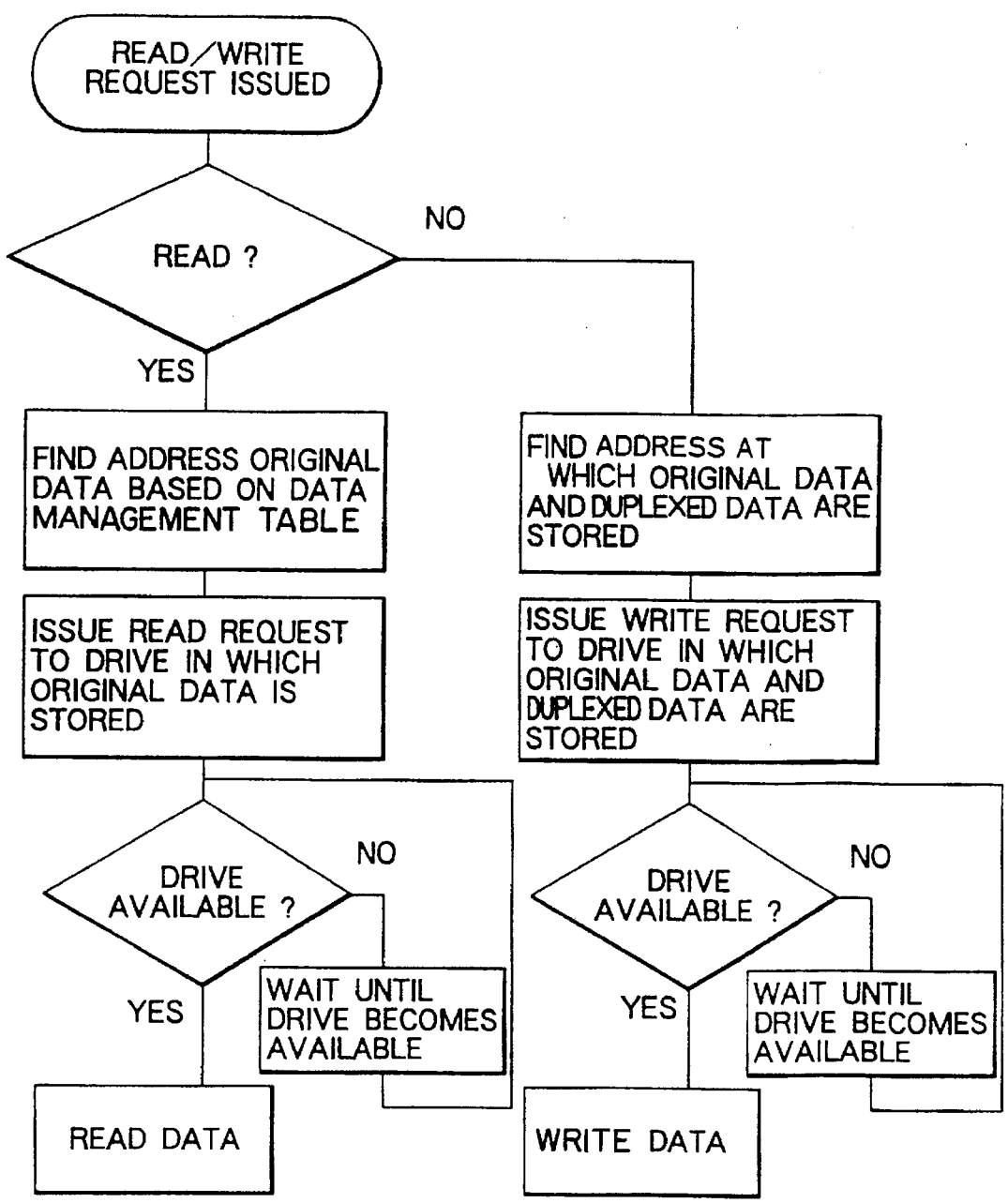
FIG. 5 shows a flow chart of a read/write process applied to the system of FIG. 1.

First, as shown in the flow chart of FIG. 5, only the original data of the data specified by the CPU 1 (in FIG. 3, the data stored in the upper address of the addresses at which the data are stored) is read and the MP 29 of the DCU 7 issues a read request to the drive in which the original data is stored. If the drive in which the original data is stored is busy and the data cannot be read out, it waits until the drive becomes available and then the reading is started.

Figure 6:
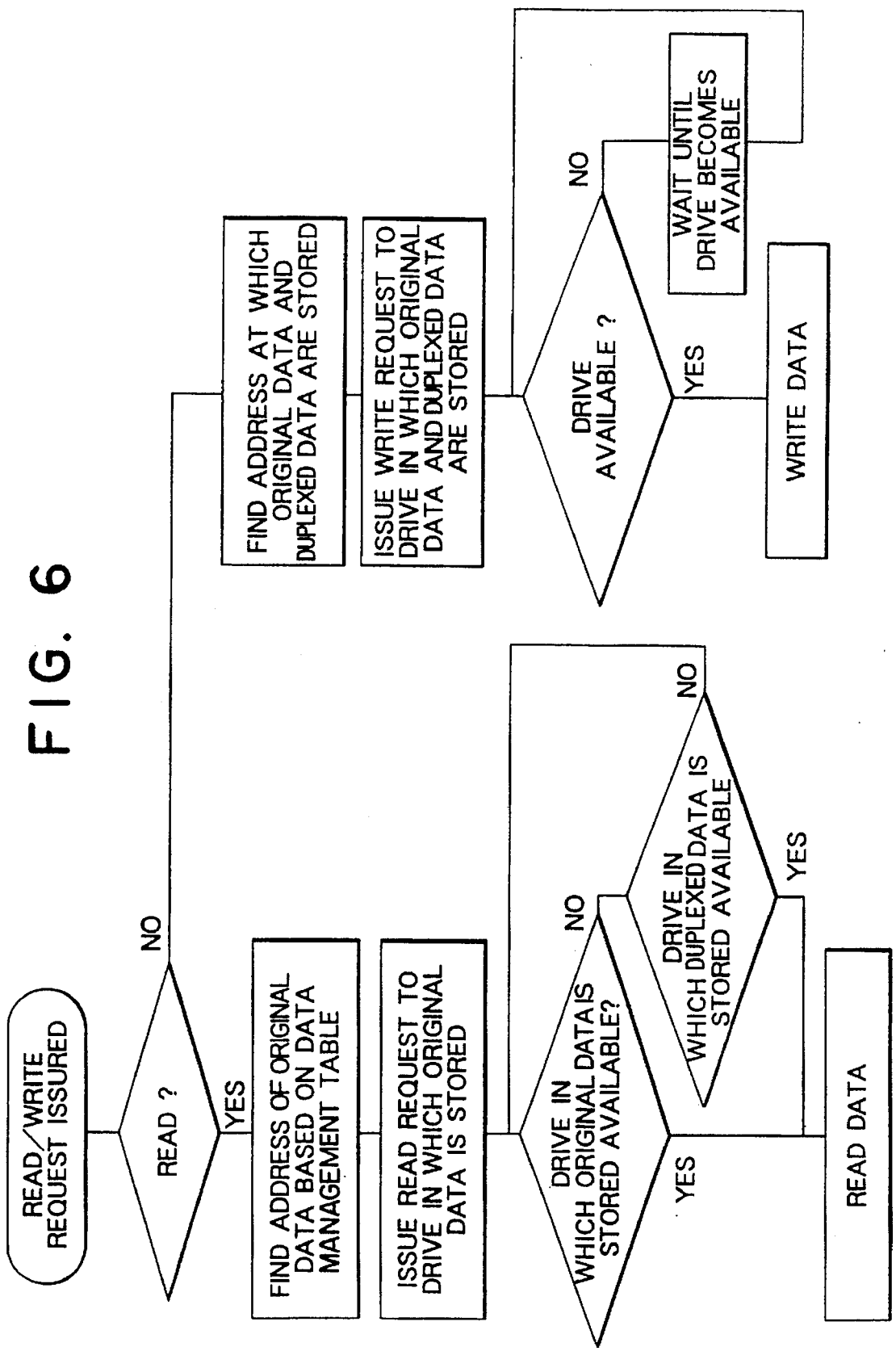
FIG. 6 shows another flow chart of the read/write process applied to the system of FIG. 1.

Secondly, as shown in the flow chart of FIG. 6, the MP 29 of the DCU 7 issues a read request to the drive in which the original data is stored in response to the request from the CPU 1, and if that drive is busy and the process is not carried out, it issues a read request to the drive in which the duplex data is stored. If both of the drives in which the original data and the duplexed data are stored respectively are busy and not available, the read process is conducted when one of the drives becomes available.

Thirdly, the original data and the duplexed data are not discriminated, and in response to the request by the CPU 1, the MP 29 of the DCU 7 issues a read request for both of the original data and the duplexed data from the beginning and processes the faster one first.

After the data has been read from the drive 4 by one of the above three methods, the interface control between the drive and the DKC 2 is conducted by the DICU 10 and the read data is transferred to the DCU 7. As soon as the DCU receives the data, it transfers the data to the CPU 1 through the CICU 6.

On the other hand, in the write mode, as shown in the flow charts of FIGS. 5 and 6, the MP 29 of the DCU 7 determines the addresses to store the original data and the duplexed data, and if the writing to the drive is ready, it immediately writes the original data and the duplexed data. If one of the drives 4 is busy and not ready to write, the data is written to the drive 4 which is ready and the data is subsequently written into the other drive as soon as the latter becomes ready. The CPU 1 does not recognize the writing of the duplexed data but the DKC 2 does it independently. When the read/write request is issued from the CPU 1 to the DKC 2, the MP 29 of the DCU 7 determines the address in the DU 3 (the drive address and the address (cylinder address and head address) in the drive) by referring to the data management table 9 and reads or writes at that address.

In the above write method, it is assumed that the data #1 to #12 are independent from each other. If they are a single consecutive data block of large amount, they are stored in one group.

Specifically, it is assumed that the data #1, #2, #3, #4, #5 and #6 in FIG. 4 are six partial data #1, #2, #3, #4, #5 and #6 into which a single consecutive data is divided. In this case, as shown in FIG. 4, the partial data #1, #2 and #3 are stored in a sub-group which is a continuous area of the group 1 of the drive #1 and the duplexed data are stored in the drives #2, #3 and #4 as they are for the independent data.

Similarly, the partial data #4, #5 and #6 are stored in a sub-group which is a continuous area in the group 1 of the drive #2 and the duplexed data are stored in the drives #1, #3 and #4 as they are for the independent data.

There is no restriction on the data size of the single consecutive data. If the data is so large that it cannot be stored in the group 1, it is consecutively stored in the group 2 in the same manner.

Accordingly, it is apparent that the present invention is applicable to a large amount data by regarding the separate data as partial data of a single large amount of data.

A method for continuously transferring data in a drive 4 at a high speed between a semiconductor memory which uses semiconductors such as the cache memory 18 or the ES 19 in the DKC 2 and the DU 3 is now described.

Where data is stored in the drives 4 in the logical group 5 as shown in FIG. 4 and the data #1, #2 and #3 in the drive #1 are desired to be sorted, or to be read at a high speed for the purpose of swapping data of a database, the MP 29 of the DCU 7 parallelly reads the data #1 from the drive #2, the data #2 from the drive #3 and the data #3 from the drive #4. By parallelly reading the distributedly stored duplexed data, the data transfer speed is three times higher than that of reading the original data stored in one drive thus, high speed transfer is attained. When the data stored in another drive is to be read, the distributedly stored duplexed data is parallelly read under the control of the MP 29 of the DCU 7 in the same manner so that the high speed transfer is attained.

The processing set forth above can be expanded. A method of high speed transfer by any data unit is now explained.

For example, where four data #2, #3, #4 and #5 are to be read at a high speed, the MP 29 of the DCU 7 parallelly reads the data from the drives #3, #4, #1 and #2, respectively. Where five data #2, #3, #4, #5 and #6 are to be read, it parallelly reads the data #2 from the drive #3, the data #3 from the drive #4, the data #4 from the drive #1, the data #5 from the drive #2, and the data #6 from the drive #4. The reading of the data #3 and #6 from the drive #4 is serial. By selecting the data to be requested from the drives 4 in the logical group 5 such that the original data and the duplexed data distributedly stored in the four drives 4 can be parallelly transferred, the data can be transferred by any unit at a high speed. This case is applicable to transfer of a large amount data by regarding the data #2, #3, #4 and #5 as the partial data #2, #3, #4 and #5 of a single large amount of data.

A method for backing up the data in the logical group 5 by using the high speed transfer is now explained.

The pair of the original data and the duplexed data are stored in logical group 5 as the identical data. Thus, in a case where data stored in the drive 2 constituting the logical group 5 is to be backed up to the group 1 consisting of six tracks shown in FIG. 4, backup of only the original data shown by hatching need be made. Thus, the MP 29 of the DCU 7 first parallelly reads the data #1 from the drive #1, the data #4 from the drive #2, the data #7 from the drive #3 and the data #10 from the drive #4. After reading those data, it parallelly reads the data #2, #5, #8 and #11 from the drives #1 to #4 and further the data #3, #6, #9 and #11. If the data #1, #2 and #3 are stored at the head addresses #0 (the tracks which allow the read/write operation by the head #0), #1 and #2 of the same cylinder address in the drive #1, the data #4, #5 and #6 are stored at the head addresses #0, #1 and #2 of the same cylinder address in the drive #2, the data #7, #8 and #9 are stored at the head addresses #0, #1 and #2 of the same cylinder address in the drive #3, and the data #10, #11 and #12 are stored at the head addresses #0, #1 and #2 of the same cylinder address in the drive #4, then the heads #0 to #2 may be sequentially selected by the head selector 15 in each drive to read the data. By parallelly reading the data from the drives of the logical group, the group of the rows #1 to #6 may be read in one quarter the time required to read the data #1 to #12 from one drive.

After the data #1 to #12 of the group 1 have been backed up, the data of the group 2 is backed up in the same manner.

Not all data need be backed up but any number of data may be backed up. Where the entire logical group 5 including the original data as well as the duplexed data is to be backed up, the data of the rows #1 to #3 are backed up and then the data of the rows #4 to #6 are parallelly read and the subsequent groups are similarly read sequentially. The parallelly read data are stored in the cache memory 18 of the DKC 2, and are stored from the cache memory 18 to a backup medium such as a magnetic disk, a magnetic tape or an optical disk.

The high speed transfer may be attained in the write mode as well by changing the parallel reading to parallel writing. In the high speed transfer in the write operation, a completion report may be sent to CPU 1 at the time when the parallel write operation of the duplexed data into the drives has been completed. In such a case, the writing to the duplexed data is completed but the writing to the original data is not completed and the data is not written in duplex. However, the writing by the high speed transfer is effective in the following case. Since the memory which uses the semiconductors is volatile, there is a demand to write the content to a non-volatile medium such as a magnetic disk as quickly as possible in order to prevent loss of data in the memory due to a power failure. To this end, the data is temporarily non-volatilized by writing it by the high speed transfer and the original data is written at an appropriate timing, judged by the MP 29 of the DCU 7, to make the duplicate data. In the writing by the high speed transfer, the MP 29 of the DCU 7 manages whether the duplication of the data is completed or not.

The read/write operation by the high speed transfer may be conducted not only between the drives 4 in the logical group 5 but also between the logical groups 5 by the coordination of the logical groups 5. If the rotations of the respective drives are synchronized in the read/write operation by the high speed transfer, the rotation waiting time in each drive 4 in the logical group 5 is equal to that for one drive system, and is one half revolution on average. Thus, the processing time is effectively reduced.

A method for recovering data in a fault drive 4 when a fault occurs in one of the drives 4 in the group 5 in the DU 3 of FIG. 1 is now explained. In FIG. 4, it is assumed that a fault has occurred in the drive #1 of the four drives 4 in the logical group 5. In this case, the MP 29 of the DCU 7 recovers the data by the following procedure.

The faulty drive #1 is first replaced by a normally functioning drive. In this case, the data in the drive #1 is stored in duplex in the drives #2, #3 and #4. Thus, when the fault occurs in the drive #1, the duplexed data of the drive #1 is read from the drives #2, #3 and #4 and the data is written into the replaced normal drive to recover the data. The original data to be stored in to the drive #1 is parallelly read from the drives #2, #3 and #4. The data is temporarily stored in the cache memory 18 in the DKC 2. When it has been stored in the cache memory 18, it is stored from the cache memory to the drive #1 which has been replaced by a normal one. After the data has been stored in the drive #1, the duplexed data of the drive #1 is temporarily stored from the drives #2, #3 and #4 to the cache memory 18 of the DKC 2, and when the storing to the cache memory 18 is completed, it is stored from the cache memory 18 to the drive #1 which is now normal. In this manner, the duplexed data is temporarily stored in the cache memory 18 and is stored from the cache memory to the drive #1 which is now normal and this process is repeated. The divided process is required because the data cannot be processed at one time since the capacity of the cache memory 18 is smaller than the capacity of the drive #1.

Figures 7A, 7B:
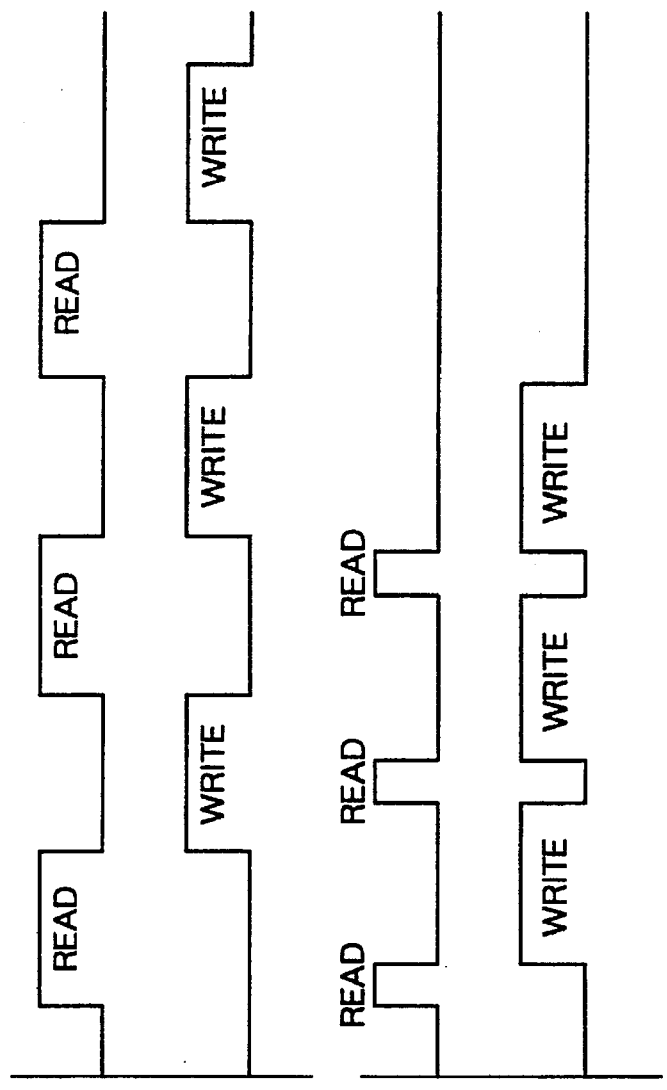
FIG. 7A shows a timing chart of a data recovery process in a disk array system of a prior art mirror system.
FIG. 7B shows a timing chart of a data recovery process in the system of FIG. 1.
Figures 8A, 8B:
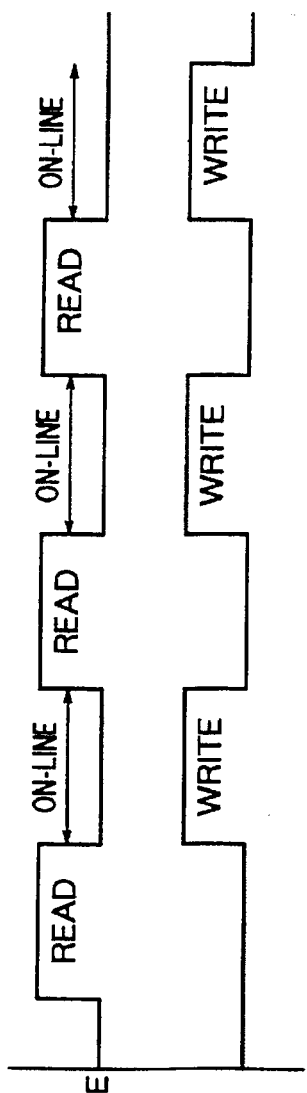
FIG. 8A shows a timing chart of a data recovery process conducted in the disk array system of the prior art mirror system while performing on-line processing.
FIG. 8B shows a timing chart of a data recovery process conducted in the system of FIG. 1 while performing on-line processing.

FIGS. 7A and 7B show timing charts of a data recovery process in the prior art mirror system and a data recovery process in the present embodiment. As shown in FIG. 7A, in the prior art mirror system, since there is one normal drive replaced, the read time of the duplexed data from the mirror drive and the write time of the duplexed data to the replaced normal drive are equal and represent the processing time in the one-drive system. On the other hand, in the present embodiment, as shown in FIG. 7B, the read time of the duplexed data is shortened by parallelly reading the duplexed data from the normal drives 4 in the logical group 5 and the data recovery time is shortened. If the normal on-line process (an access request from the CPU 1) is accepted in the drives #2, #3 and #4 in which the duplexed data is stored when the duplexed data stored in the cache memory 18 is to be stored into the drive #1 which is now normal, the on-line acceptance time is longer in the present embodiment than in the prior art mirror system assuming that the recovery time is the same as that of the prior art mirror system as shown in FIGS. 8A and 8B, and the reduction of the performance of the on-line processing during the recovery process can be suppressed.

Figure 9A:
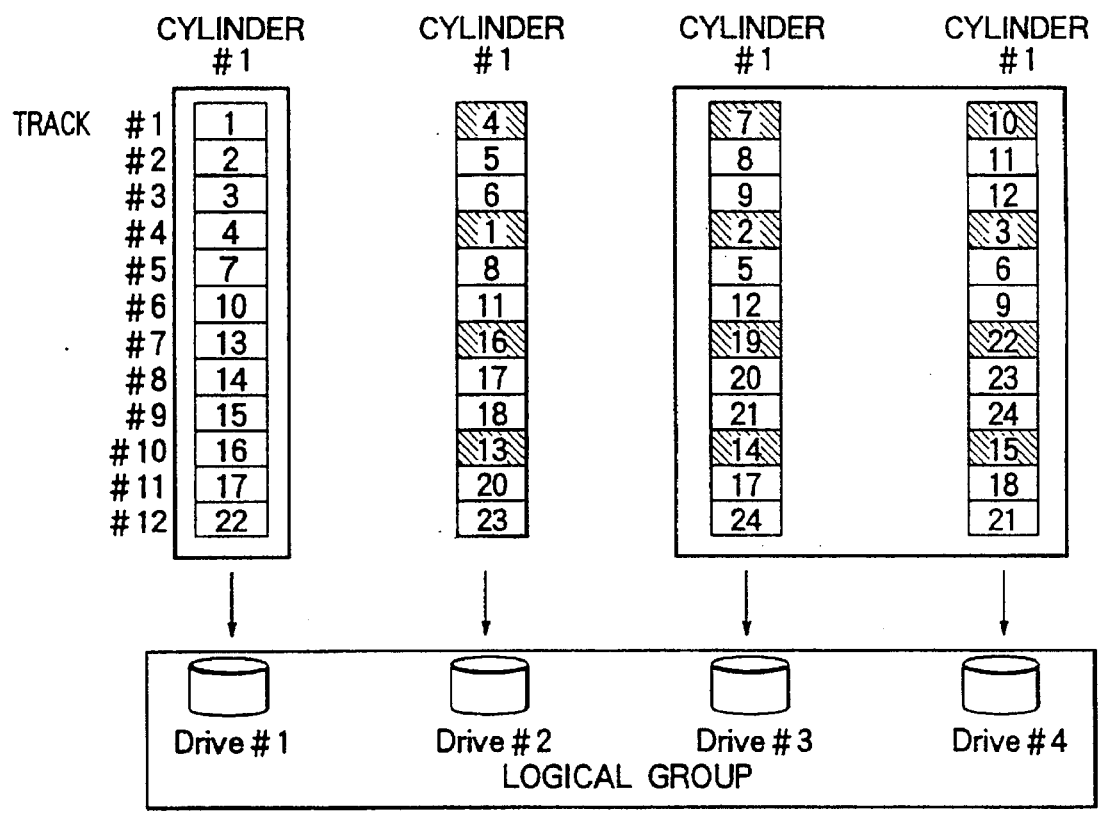
FIG. 9A illustrates another data recovery process in the system of FIG. 1 while performing the on-line processing.
Figure 9B:
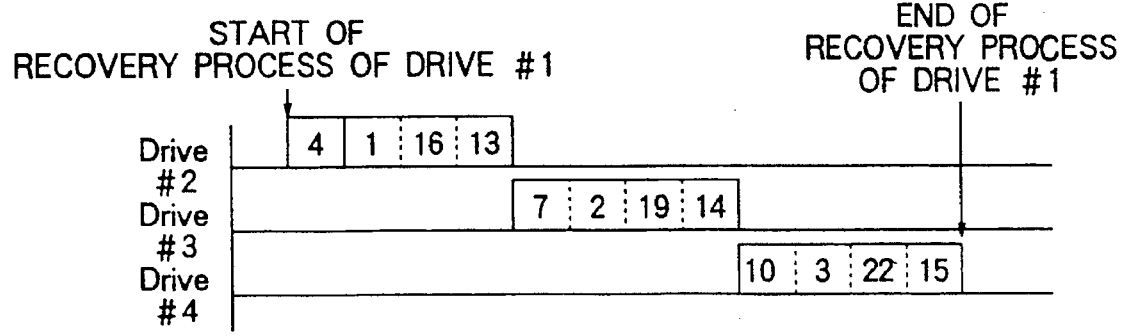
FIG. 9B shows a timing chart of the process of FIG. 9A.

In another method for suppressing the reduction of the on-line processing performance during the data recovery process, when a fault occurs in the drive #1 and the duplexed data is to be read into the cache memory 18, the duplexed data stored are sequentially read from the respective drives instead of parallelly reading from the drives #2, #3 and #4. This method is now explained with reference to FIGS. 9A and 9B. As shown in FIG. 9A, the data #4, #1, #16 and #13 are stored in the drive #2, the data #7, #2, #19 and #14 are stored in the drive #3, and the data #10, #3, #22 and #15 are stored in the drive #4 as the duplexed data of the drive #1. When a fault occurs in the drive #1, the drive #1 is replaced by a normal one, and as shown in FIG. 9B, the data #4, #1, #16 and #13 are stored from the drive #2 to the cache memory 18 and the data is stored from the cache memory 18 to the drive, which is now normal, to recover the data. During the data recovery process from the drive #2, the normal on-line process is carried out in the drives #3 and #4. When the recovery process in the drive #2 is completed, the data #7, #2, #19 and #14 are read from the drive #3 to recover the data. During this period, the normal on-line process is carried out in the drives #2 and #4. Similarly, after the recovery process of the drive #3 is completed, the recovery process is carried out in the drive #4. By switching the drive 4 which is the subject of the data recovery, the drives 4 which are occupied by the data recovery process can be distributed to prevent the presence of a long period during which the data is not read or written due to the data recovery process. As a result, the data which are subject to the inhibition of the read/write due to the data recovery process are averaged so that the impact is not concentrated on a particular user but is averaged among users. In the present embodiment, the drive 4 in which the fault has occurred is replaced by a normal one and the data is recovered in that drive. Alternatively, a drive 4 may be provided in the DU 3 as a spare of the faulty drive, and the spare drive is selected as soon as the fault occurs to carry out the data recovery.

The read process performance during the write process is now discussed in comparison with that of the prior art mirror system.

Figure 10A:
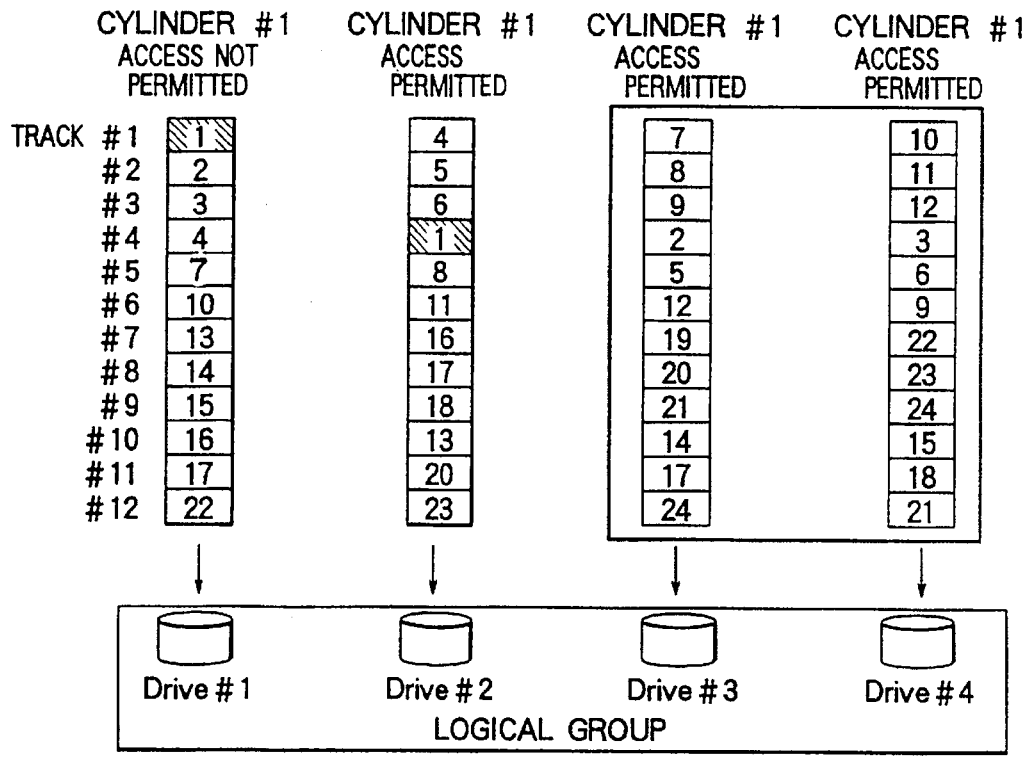
FIG. 10A illustrates a read process during a write process in the system of FIG. 1.
Figure 10B:
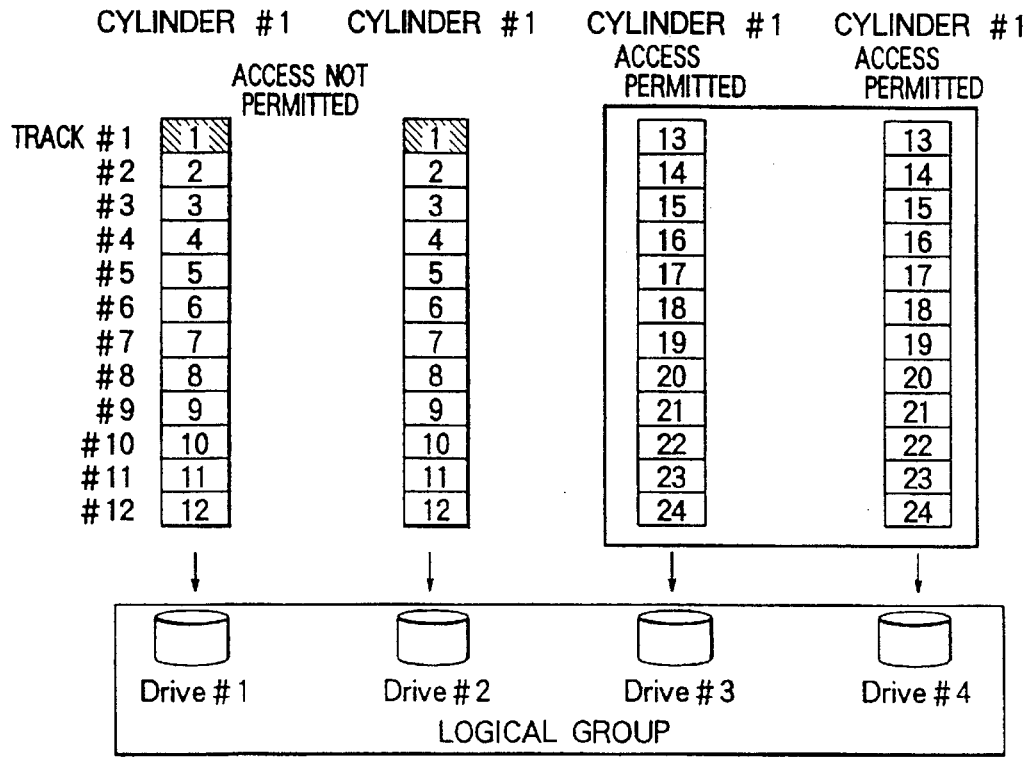
FIG. 10B illustrates a read process during the write process in the prior art mirror system.

FIGS. 10A and 10B show types of data which can be read during the write process in the present embodiment and the prior art mirror system. For example, when the data #1 is to be written, as shown in FIG. 10A, a write request is issued to the drives #1 and #2 to write data in the present embodiment. On the other hand, in the prior art mirror system, a write request is also issued to the drives #1 and #2 to write data. In any method, the read process to the drives #3 and #4 is permitted while data is written in the drive #1. However, as shown in FIG. 10A, 20 types of data are stored in the drives #3 and #4 in the present embodiment while only 12 types of data are stored in the drives #3 and #4 in the prior art mirror system as shown in FIG. 10B. Thus, while the number of drives which are permitted to read data during the write process is the same, that is two, in the present embodiment and the prior art mirror system, the number of types of the data stored in the two drives 4 is 1.7 times larger in the present embodiment. As a result, in the present embodiment, when the CPU 1 issues a read request during the write process, the probability of the presence of the requested data in the two drives in the logical group 5 which are permitted to read during the write process is high. Accordingly, the read process during the write process can be efficiently carried out.

In the present embodiment, when read/write requests are concentrated to a particular drive, they may be efficiently processed in the following manner.

Figure 11A:
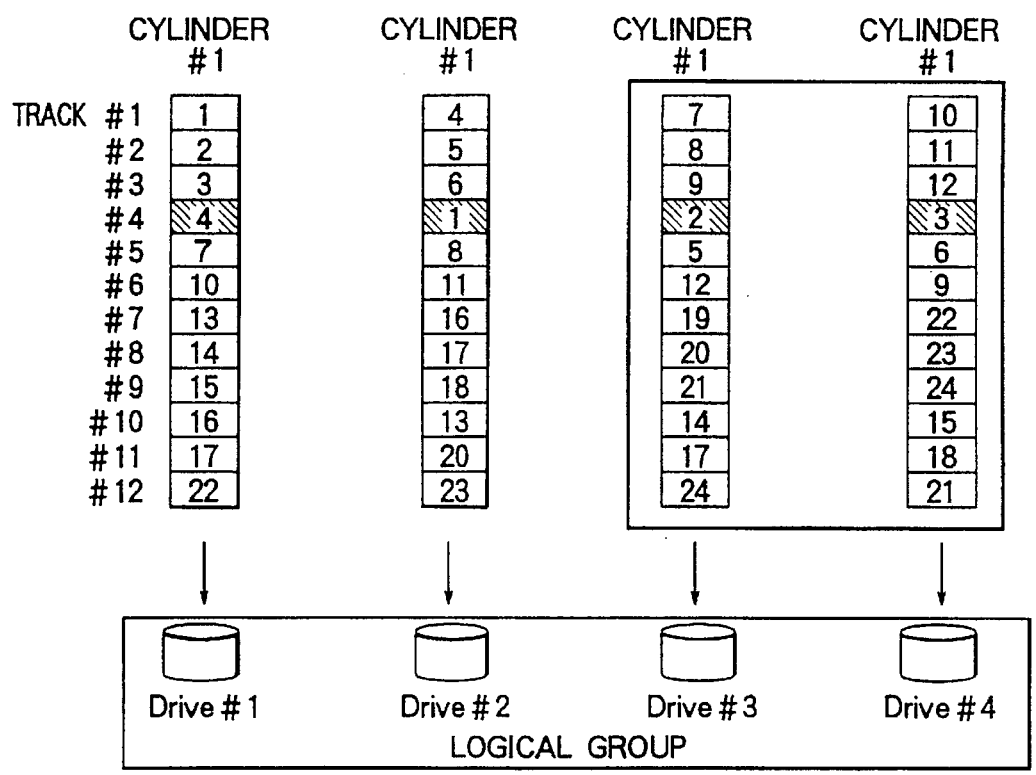
FIG. 11A illustrates an effect of data distribution in the system of FIG. 1.
Figure 11B:
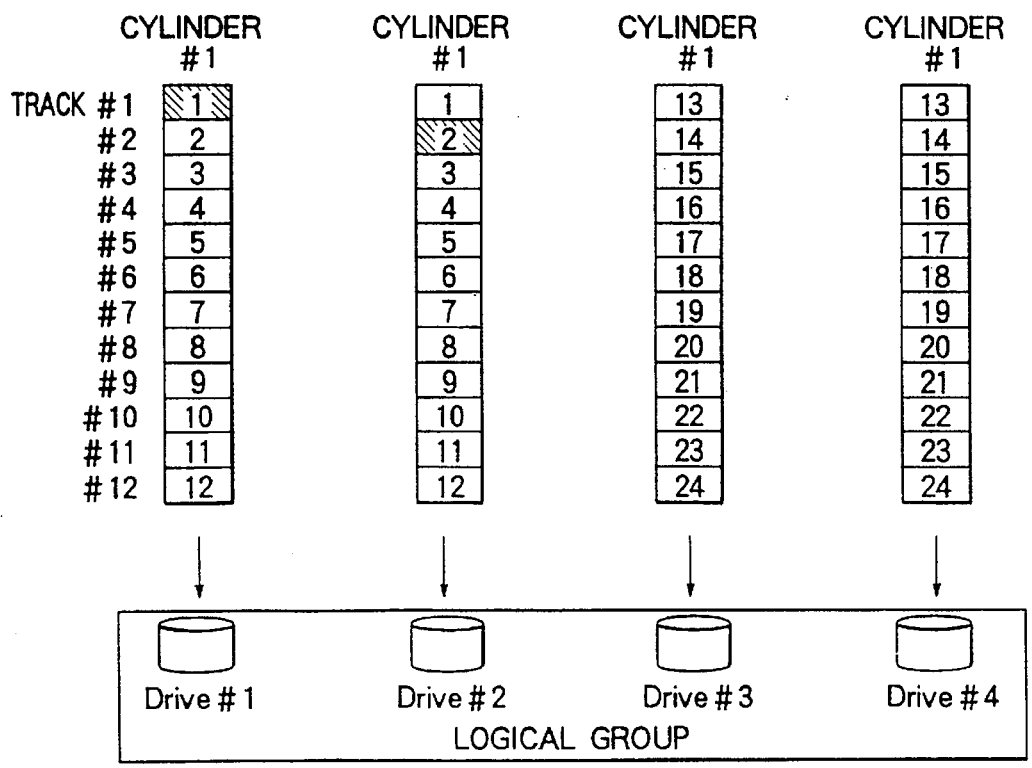
FIG. 11B illustrates an effect of data distribution in the prior art mirror system.

In a computer system, it may happen that read/write requests are concentrated to a particular area in a secondary memory. Particularly, read requests may be concentratively issued to a particular drive. Methods for processing the read requests concentrated to the drive #1 in the duplex system of the present embodiment and the prior art mirror system are explained with reference to FIGS. 11A and 11B. In the present embodiment, as shown in FIG. 11A, the duplicates of the data in the drive #1 are distributedly stored in the drives #2, #3 and #4 as the duplexed data. Accordingly, as seen from FIG. 11A, four read requests may be processed simultaneously where each logical group comprises four drives. Whether the read requests are concentrated to a particular drive or not may be determined by storing the read requests issued to the drives at a predetermined interval in the MP 29 of the DCU 7 in the DKC 2, and when the count exceeds a preset count, reading the data from the duplexed data by the data control unit 8 in the MP 29 of the DCU 7 while referring the data management table 9. Instead of reading the duplexed data by the DKC 2 only when the read requests are concentrated to the particular drive, the MP 29 of the DCU 7 may consider each logical group as one large data space and always pay attention to the duplexed data of the data to which the read request has issued, and if the drive which stores the original data is busy, the status of the drive which stores the duplexed data is checked, however, it is not busy, the read request from the CPU 1 is accepted.

The original data and the duplexed data may be equally handled without discrimination but by assigning two addresses to one data. In this manner, even if the read requests are concentrated to the particular drive, they are averaged through the drives 4 in the logical group 5 so that efficient processing is attained. On the other hand, in the prior art mirror system, since the duplexed data of the drive #1 is present only in the drive #2, only two read requests may be processed simultaneously. Thus, when the read requests are concentratively issued to the particular drive 4, the duplexed data which is distributedly stored in the drives 4 in the logical group 5 is processed in the present embodiment so that twice the number of requests processed in the prior art mirror system can be processed. In the write mode, when the read/write requests are concentrated to one drive, the waiting time of the drive to which the read/write requests are concentrated may be reduced by the following process. The duplexed data for the original data is written into the drive other than the drive to which the read/write requests are concentrated and the end of the write process is reported to the CPU. The written data is stored in the cache memory. When the concentration of the read/write requests to the drive to which the read/write requests are concentrated is later released, the MP 29 of the DCU 7 writes the original data or the duplexed data from the cache memory to the drive to which the read/write requests have been concentrated to complete the duplication. The determination as to whether the duplication is completed or not is indicated by the write flags of the original data address and the duplexed data address of the address management table. When the write flag is "1", it indicates that the writing to the drive has been conducted and when it is "0", it indicates that the writing to the drive is not completed.

When a read request is issued from the CPU 1 to the data prior to the completion of the duplication, the corresponding data is transferred from the cache memory to the CPU 1.

On the other hand, when a write request is issued from the CPU 1 to the data prior to the completion of duplication, the original data or the duplexed data is written into the drive other than the drive to which the read/write requests are concentrated as in the previous write case, the end of the writing is reported to the CPU 1, and the MP 29 of the DCU 7 later completes the duplication.

While the present embodiment has been explained for the drive #1, the same is true for any drive of the logical group 5.

Embodiment 2

Figure 12:
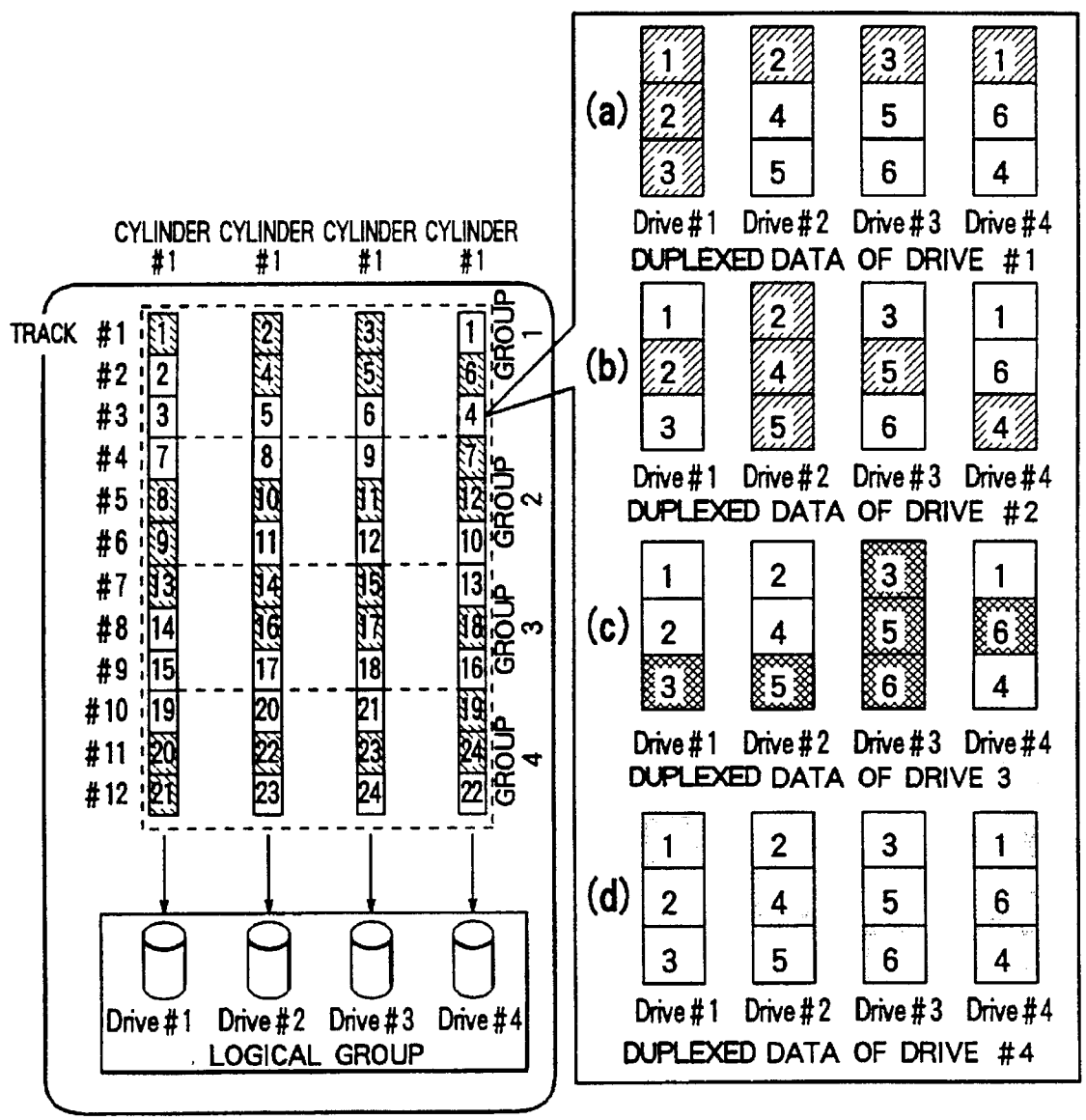
FIG. 12 illustrates the storing of data by a second data storing method applied to the system of FIG. 1.

In the present embodiment, a method shown in FIG. 12 is used as a method for storing the data in the system shown in FIG. 1.

In the present embodiment, data is stored by group consisting of three tracks as shown in FIG. 12. The number of columns in a group varies with the number of drives 4 of the logical group 5 and is given by (m−1) where m is the number of drives 4 in the logical group 5. The group consists of six original data and the duplexed data thereof, and the original data and the duplexed data are stored in different drives 4. In principle, the duplexed data may be stored in any drive 4 other than the drive 4 in which the original data is stored so long as the duplexed data are uniformly distributed to the drives 4 in the logical group 5. The original data and the duplexed data are close in the group consisting of three tracks.

A function of the DCU 7 in the present embodiment is now explained in detail.

Figure 13:
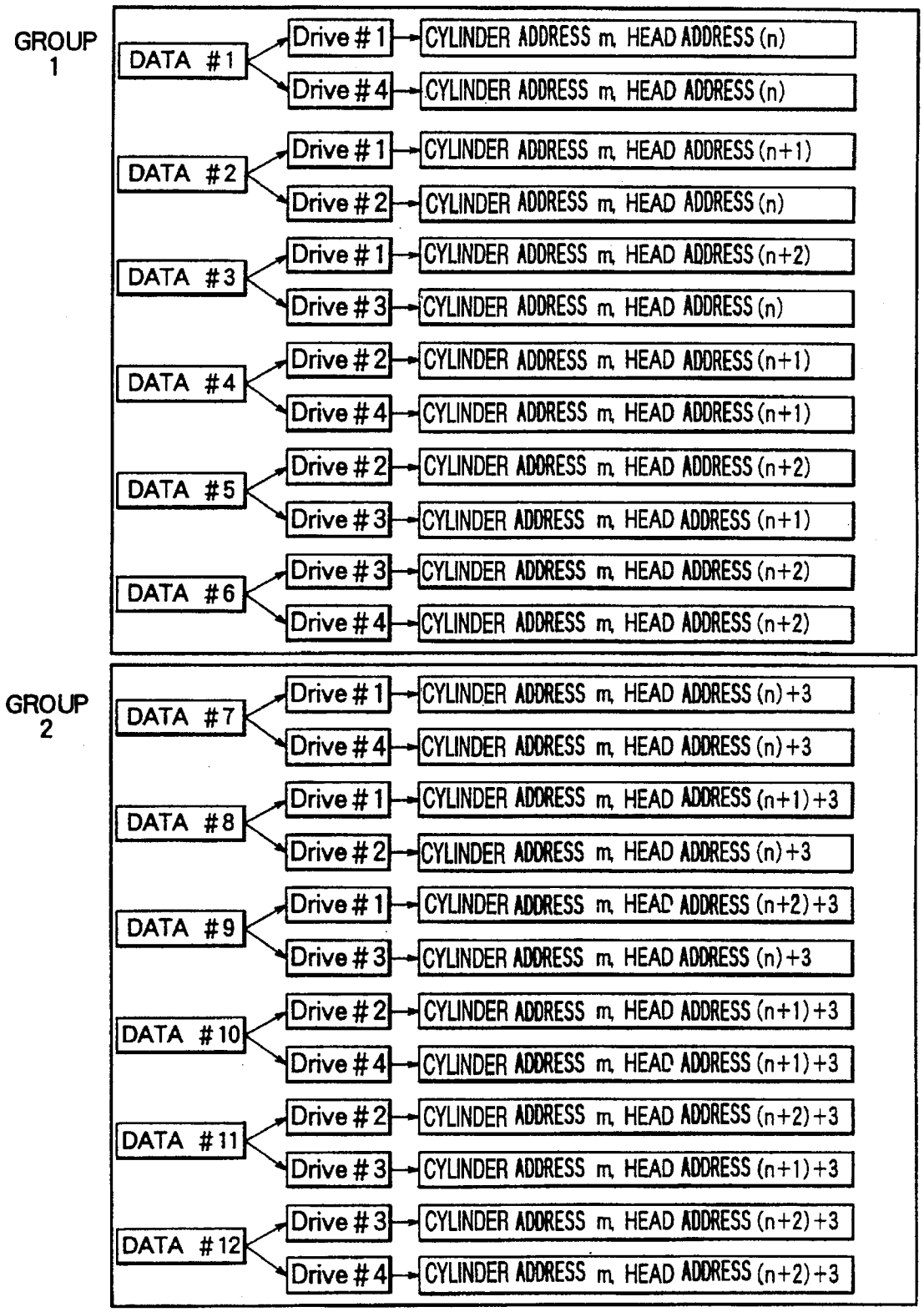
FIG. 13 illustrates addresses to the data used in FIG. 12.

The drive number, the cylinder address and the head address, which are addresses of areas allocated to the original data and the duplexed data corresponding to the requested data, are stored, similar to the Embodiment 1, in the data management table 9 of the DCU 7 in accordance with the storing rule as shown in FIG. 13. Also in the present embodiment, similar to the Embodiment 1, there have been registered the original data address and the duplexed data address in accordance with the storing rule in the address management table 9 at the initial setting stage. When the data is to be written or deleted, the data name is registered in or deleted from the address management table 9. As described before, in the present embodiment, each group consists of six original data and the duplexed data thereof. For example, the group 1 comprises data #1 to #6.

In the present embodiment, the data name is the area name in the following description.

In each group, the data are stored in a fixed rule, that is, in ascending order of the data number as shown in FIG. 12.

For example, in the group 1, as shown in FIG. 12 and FIG. 13 (where m=1, n=1), the data #1 is stored at (1, 1) in the drive #1 and (1, 1) in the drive #4, the data #2 is stored at (1, 2) in the drive #1 and (1, 1) in the drive #2, the data #3 is stored at (1, 3) in the drive #1 and (1, 1) in the drive #3, the data #4 is stored at (1, 2) in the drive #2 and (1, 3) in the drive #4, the data #5 is stored at (1, 3) in the drive #2 and (1, 2) in the drive #3, and the data #6 is stored at (1, 3) in the drive #3 and (1, 2) in the drive #4. For the groups 2, 3, 4, . . . , the data are stored in accordance with the rule shown in the address management table 9 in a similar manner to that in the group 1.

In the present embodiment, the original data and the duplexed data are set as shown in FIG. 12, in which hatched data are original data and other data are duplexed data. As seen from FIG. 12, the rule to store the data is common to the respective group but the manners of setting of the original data and the duplexed data are different between the odd numbered groups and the even numbered groups. This is for the purpose of convenience in backing up the data to be described later. While only groups 1, 2, 3 and 4 are shown in FIG. 12, the setting of the original data and the duplexed data is changed between the odd numbered groups and the even numbered groups in other respective groups.

The present embodiment is the same as the Embodiment 1 in that, when there are m drives, data in each of the m drives is duplexed distributively in the other m−1 drives. However, the present embodiment is different from the Embodiment 1 in that, as shown in FIG. 12, with respect to the area group consisting of the (m−1) areas for each drive×the number of the drives m, the areas holding the original data and the duplexed data are distributed to a different drive.

In the present embodiment, no restriction is imposed to the unit of data but in the following description, one track capacity is considered as the unit of data.

In the DCU 7, the MP 29 of the DCU 8 searches the address at which the duplexed data is stored from the data management table 9 based on the address of the ordinal data specified by the CPU 1 and performs the read/write process to the drives 4 in which the original data and the duplexed data are stored. The method for reading and writing the data is same as that in the Embodiment 1.

A method for transferring the data stored in a particular drive 4 at a high speed between the memory using the semiconductors such as the cache memory 18 or the ES 19 in the DKC 2 and the DC 3 shown in FIG. 1 is now explained.

For example, in the group 1, when the data #1, #2 and #3 in the drive #1 are to be read at a high speed, the MP 29 of the DCU 8 parallelly reads the data #1 from the drive #4, the data #2 from the drive #2 and the data #3 from the drive #3. Similarly, as to the data #2, #4 and #5 of the drive #2, it parallelly reads them from the drives #1, #3 and #4, respectively. In this manner, where the data stored in the particular drive 4 is to be read, the data stored in the other three drives are parallelly read so that the data transfer speed is approximately three times higher than that in reading from one drive, and the high speed transfer is thus attained. The same high speed transfer can be attained for the data stored in the drives #3 and #4, and the data of other groups.

A method of high speed transfer of any unit of data is now explained. For example, when four data #2, #3, #4 and #5 are to be read at a high speed, the MP 29 of the DCU 8 parallelly reads the data #2 from the drive #1, the data #3 from the drive #3, the data #4 from the drive #4 and the data

5 from the drive #2. When five data #2, #3, #4, #5 and #6 are to be read, the MP 29 of the DCU 8 parallelly reads the data #2 from the drive #1, the data #3 from the drive #3, the data #4 from the drive #4, the data #5 from the drive #2 and the data #5 from the drive #3.

In this manner, the MP 29 of the DCU 8 selects the requested data from the drives 4 of the logical group 5 such that the parallel transfer of the original data and the duplexed data distributedly stored in the four drives 4 is attained so that the high speed transfer by any unit of data is attained.

A method for backing up the data in the logical group 5 by using the reading by the high speed transfer is now explained.

The pair of the original data and the duplexed data are stored in the logical group 5 as the identical data. Accordingly, only the original data shown by hatching in FIG. 12 need be backed up. Thus, in backing up the data, the MP 29 of the DCU 8 sets the two groups as one unit and parallelly reads the data #1, #2, #3 and #6 of the group 1 from the drives #1, #2, #3 and #4. After it has read those data, it switches the head by the head selector 15 and parallelly reads the data #4 and #5 of the group 1 from the drives #2 and #3 and the data #8 and #7 of the group 2. After it has read those data, it again switches the head by the head selector 15 and parallelly reads the data #9, #10, #11 and #12 of the group 2. Similarly, the data is backed up sequentially by setting two groups as one unit.

Instead of backing up the entire data in the logical group 5, partial data of any number of data may be backed up. Where the entire logical group 5 including the original data and the duplexed data as well is to be backed up, the MP 29 of the DCU 8 parallelly reads the data from the drives #1 to #4 starting from the row #1. The parallelly read data are temporarily stored in the cache memory 18 of the DKC 2 and are transferred from the cache memory 18 to a backup medium such as a magnetic disk, a magnetic tape or an optical disk and stored therein.

The high speed transfer may be attained in the write process as well. However, in the high speed transfer in the write process, the writing of the original data and the duplexed data is not completed in one write process as they are in the Embodiment 1, and the data are not written in duplex. The MP 29 of the DCU 8 controls whether the duplexing of the data has been completed or not in the write process by the high speed transfer by referring to the data management table 9.

The read/write process by the high speed transfer described above may be performed not only between the drives 4 in the logical group 5 but also between logical groups 5 through coordination between the logical groups 5. In the read/write process by the high speed transfer, the rotations of the respective drives may be synchronized so that the rotation waiting time in each drive 4 of the logical group 5 is equal to that of the one drive system and is one half revolution on average, and the processing time is effectively shortened.

Figure 14:
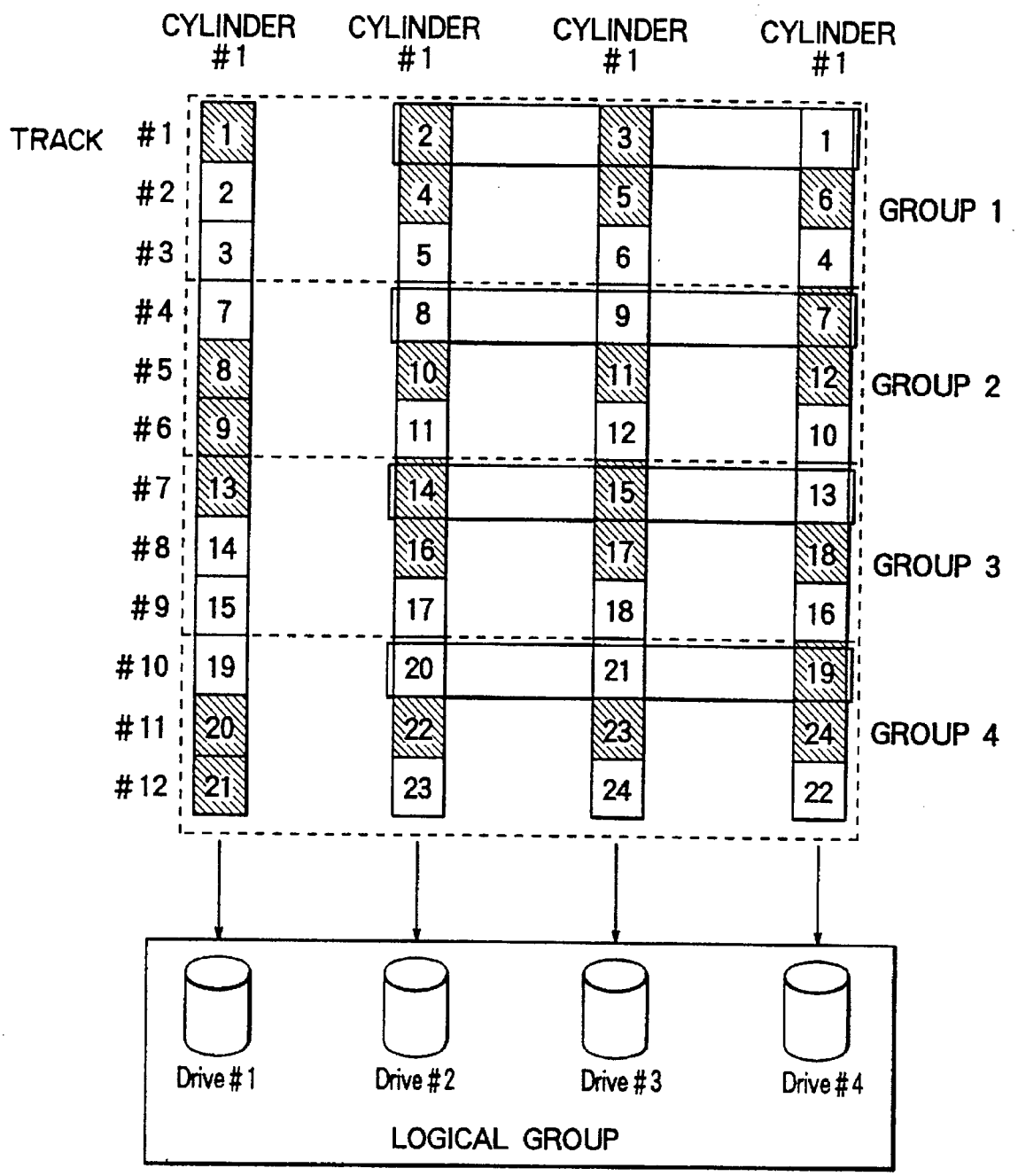
FIG. 14 illustrates a data recovery process at a fault in a drive when the data string method shown in FIG. 13 is adopted in the system of FIG. 1.

A method for recovering data of a fault drive 4 when a fault occurs in one of the drives 4 of the logical group 5 in the DU 3 of FIG. 1 is now explained. It is assumed that a fault occurs in the drive #1 of the four drive 4. In this case, the MP 29 of the DCU 7 recovers the data in the following procedure. First, it replaces the fault drive #1 with a normal drive. As shown in FIG. 14, the same data as those in the drive #1 are stored in the drives #2, #3 and #4. Thus, the data of the drive #1 is read from those drives #2, #3 and #4 and they are written into the replaced normal drive to recover the data. The data #1, #2 and #3 stored in the drive #1 are parallelly read from the drives #2, #3 and #4, respectively. Those data are temporarily stored in the cache memory 18 in the DKC 2 and stored from the cache memory 18 to the drive #1 which is now normal. After the data have been stored in the drive #1, it again reads the data of the drive #1 from the drives #2, #3 and #4 and they are stored in the drive #1 which is now normal through the cache memory 18. The recovery process is repeated to recover the entire data in the drive #1. If the capacity of the cache memory 18 is larger than the capacity of the drive #1, the entire data to be stored in the drive #1 is stored in the cache memory 18 and it is then stored in the drive #1 so that the process may be completed in one time.

A timing chart of the data recovery process in the present embodiment is same as that of the Embodiment 1 shown in FIG. 7A. In the present embodiment, like the Embodiment 1, the data read time is shortened compared to that in the prior art mirror system and the data recovery time is shortened. The present embodiment also suppresses the reduction of the on-line processing performance during the recovery process as explained in the Embodiment 1.

All functions and effects attained in the Embodiment 1 are applicable to the method of storing data in the present embodiment. While the logical group 5 consists of four drives in the present embodiment, the number of drives is not restricted so long as it is two or more.

Embodiment 3

Figure 15A:
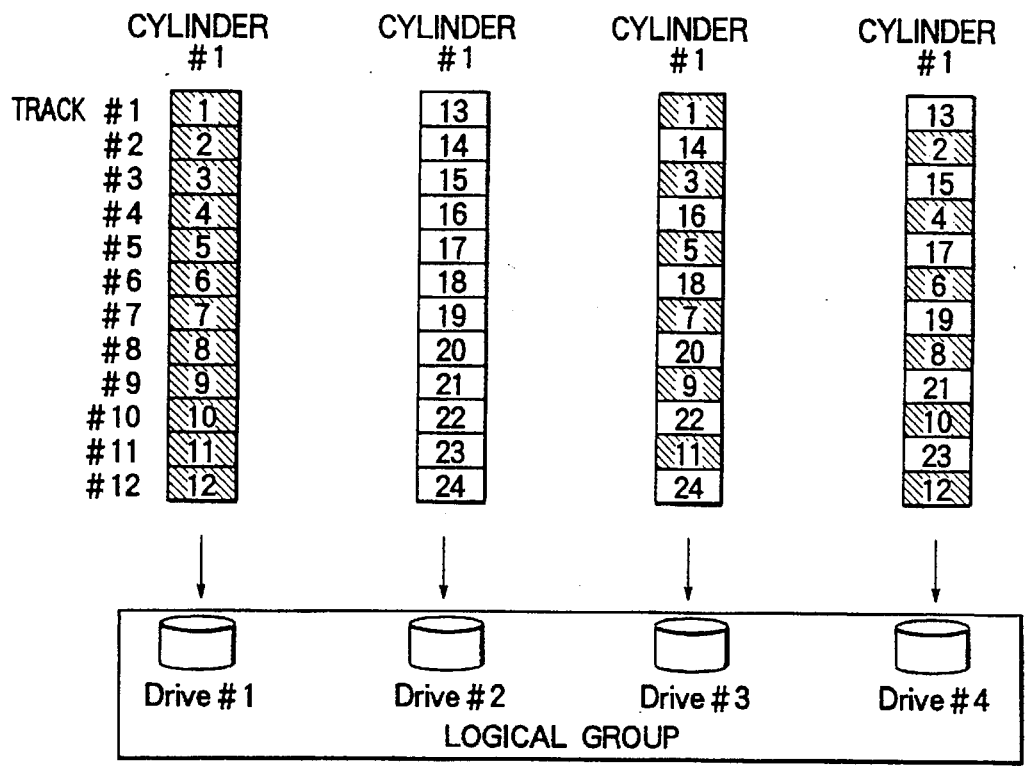
FIG. 15A illustrates the storing of data by a third data storing method applicable to the system of FIG. 1.

A further method of storing data is shown in FIG. 15A.

Also in the present embodiment, similar to the Embodiments 1 and 2, the duplexed data address has been preliminarily allocated to the original data in the address management table 9 at the initial setting stage. When the data is to be written or deleted, the data name is registered in or deleted from the address management table 9.

In FIG. 15A, the duplexed data is distributedly stored in two drives. There is no restriction on the distribution method of the duplexed data. Specifically, in FIG. 15, when the duplexed data for the original data stored in the drive #1 is to be stored in the drives #3 and #4, one half of the original data stored in the drive #1 is stored in the drive #3 and the other half is stored in the drive #4. The selection as to the particular half of the original data stored in the drive #1 which is to be stored in the drive #3 and the particular half to be stored in the drive #4 is arbitrary. It is only needed to distributedly store the duplexed data in two or more drives other than the drive in which the original data is stored. In short, in the present embodiment, the number m of drives is equal to 2k (k≧2), and an area for storing the original data is provided in each of k drives and the duplexed data of the original data of the respective drives are distributedly stored in the remaining k drives. In the present embodiment, the original data of one drive is divided into twelve and they are distributedly stored in the k drives. Thus, where the number of drives is m, the number n of drives in which the duplexed data for the original data in each drive is distributedly stored is equal to m/2. More generally, n≧2 and m≧4. The duplexed data of the drive #1 is alternately stored in the drives #3 and #4.

Embodiment 4

Figure 15B:
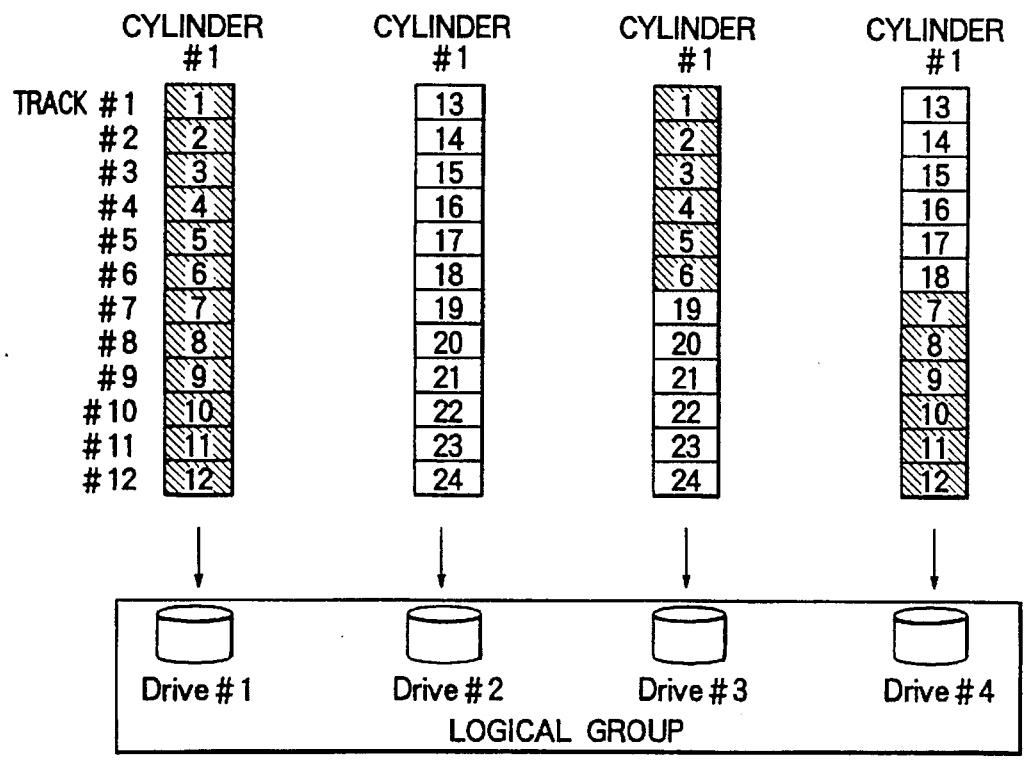
FIG. 15B illustrates the storing of data by a fourth data storing method applicable to the system of FIG. 1.
Figure 16A:
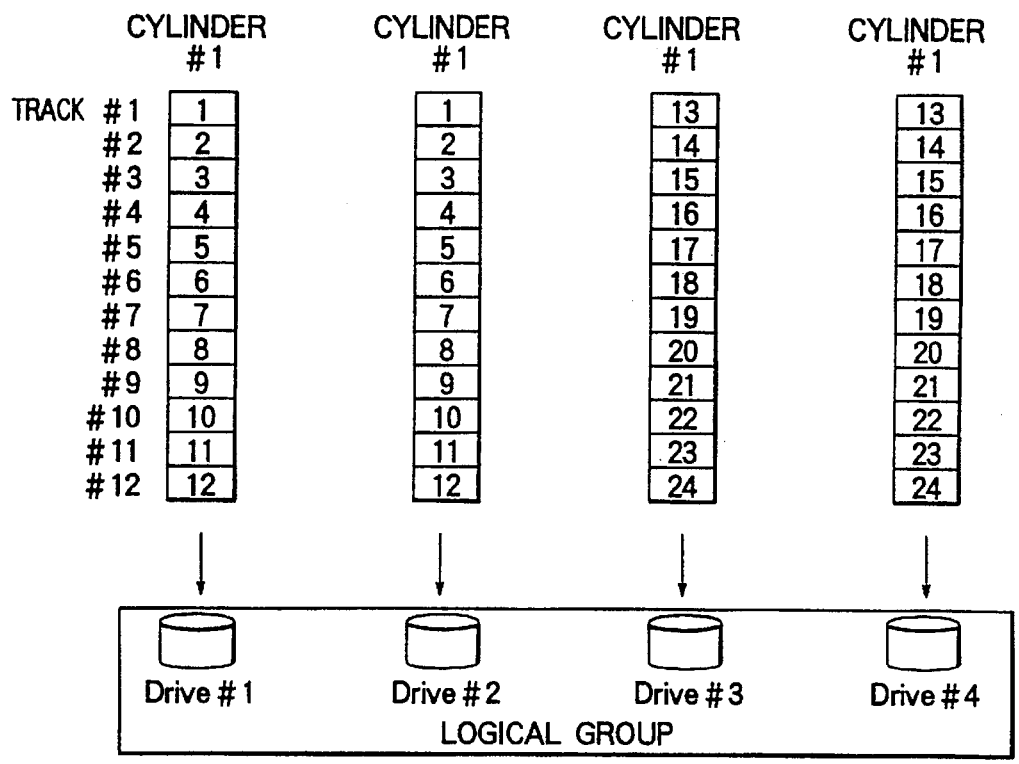
FIG. 16A illustrates the data storing in a prior art disk array system.
Figure 16B:
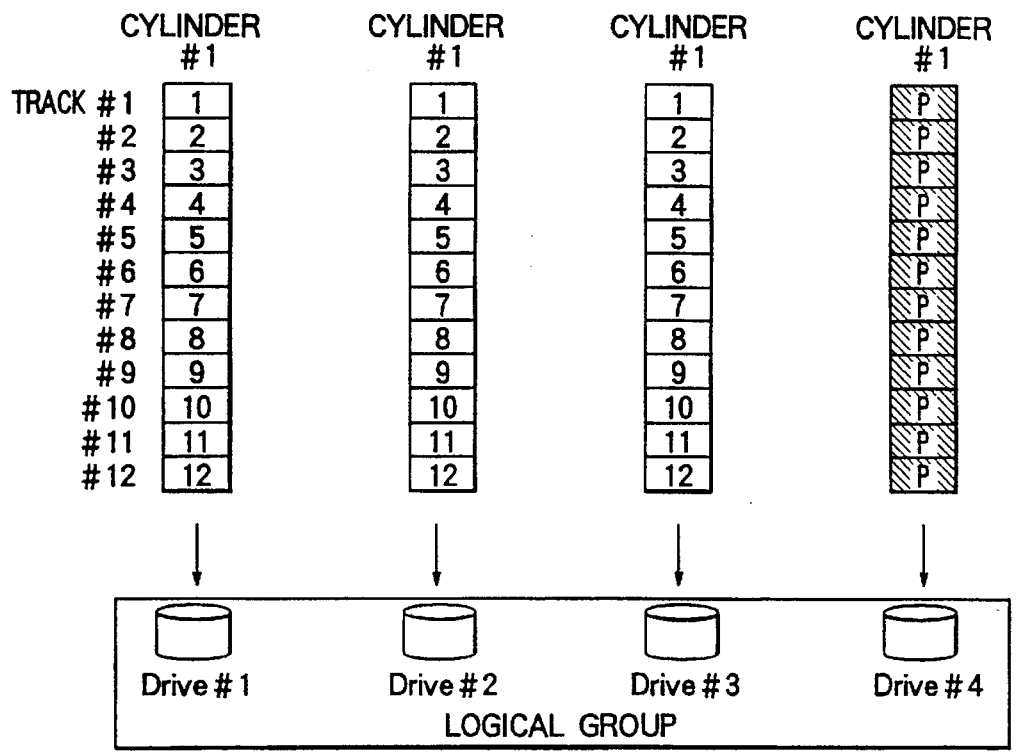
FIG. 16B illustrates the data storing in another prior art disk array system.
Figure 17A:
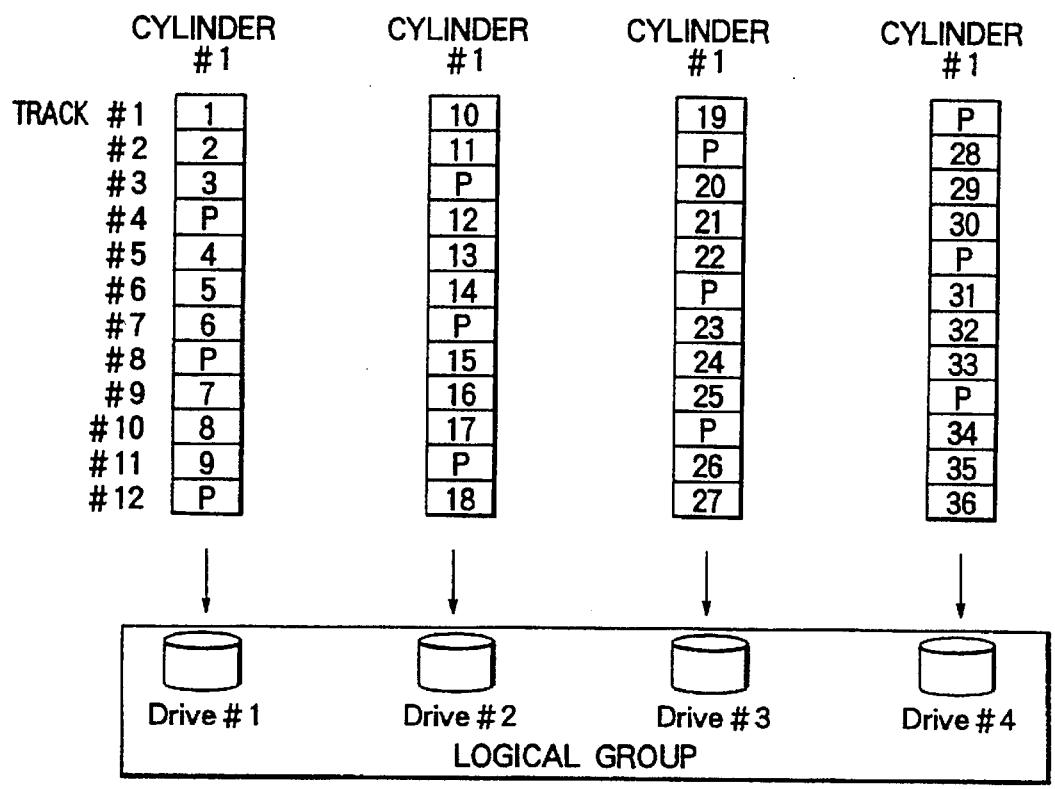
FIG. 17A illustrates the data storing in a further prior art disk array system.
Figure 17B:
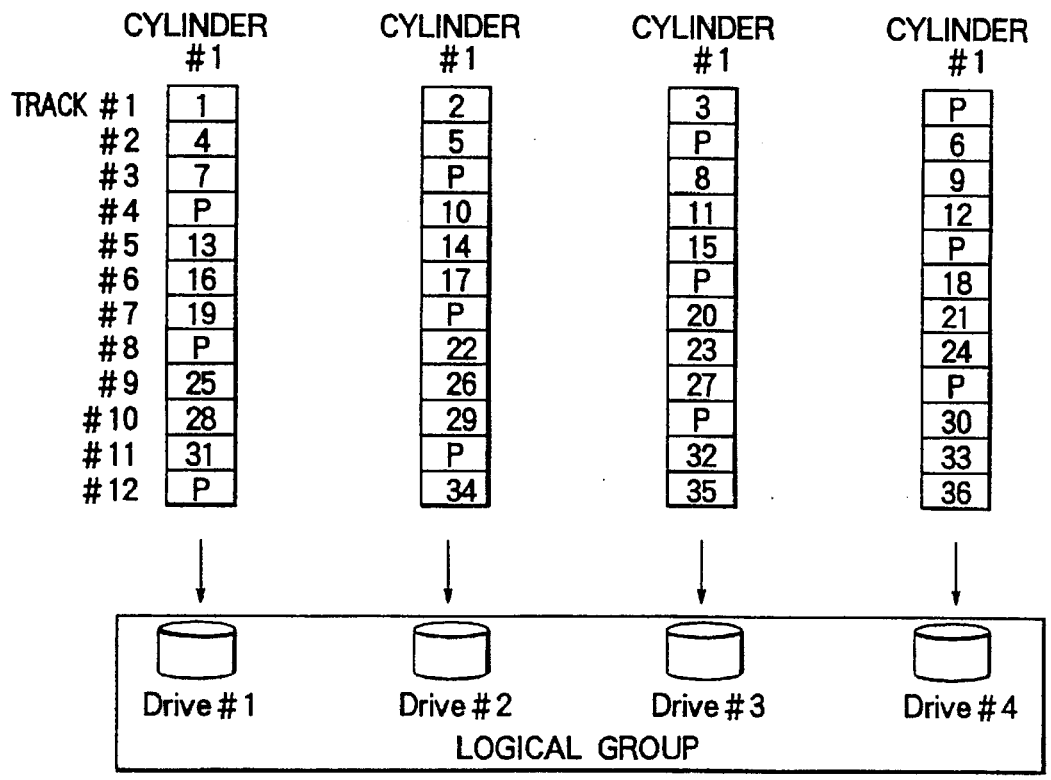
FIG. 17B illustrates the data storing in a still further prior art disk array system.

As shown in FIG. 15B, the duplexed data of the drive #1 is stored in the drives #3 and #4, and the data of the drive #2 is also stored in the drives #3 and #4. The embodiment of FIG. 15B differs from the embodiment of FIG. 15A in that a certain number of data are stored in in blocks alternating between drives #3 and #4 in FIG. 15B. The same functions and effects as those of the Embodiment 1 are attained in the Embodiments 3 and 4 in which the data are distributedly stored as described above. For example, as shown in FIG. 15A, where the original data of the drive #1 is distributedly stored in the drives #3 and #4 and the data #1, #2 and #3 are to be simultaneously read at a high speed by a request such as backup, the data #1 in the drive #1, the data #2 in the drive #4 and the data #3 in the drive #3 are parallelly and simultaneously read to attain the parallel processing by the three drives. This may also be applied to distribute the read/write requests to the drive #1 when the read/write requests are concentrated to the drive #1. In general, in the present embodiment, where the number of drives is m, the number n of drives in which the duplexed data is to be distributedly stored is equal to m/2 so that n+1=m/2+1 data may be parallelly read from different drives. In the present embodiment, the number n of drives in which the duplexed data in the same drive is distributedly stored is smaller than m−1 which is smaller than the numbers in the Embodiments 1 and 2. Accordingly, the number of data that may be read parallelly is smaller than m−1 but the positional relation between the original data areas and the duplexed data areas is simple and the determination of those areas is simpler in the present embodiment than in the Embodiments 1 and 2.

Embodiment 5

In the present embodiment, a method for securing continuous areas in UNIX in which it is difficult to secure continuous areas is explained. In the UNIX writing, data is automatically written into a vacant area which is not used in the drive in which the data is to be written. It is assumed that the CPU 1 is to write sequential data #1, #8 and #12 to the drive #1. If a continuous area (continuous addresses in the drive) sufficient to store the data #1, #8 and #12 is secured, the data are stored therein, but if the continuous area is not secured, the following process is executed. In the drive #1, if the (cylinder addresses, head addresses)=(cylinder #1, track #1) and (cylinder #3, track #2) and (cylinder #4, track #3) are vacant areas, the data #1, #8 and #12 are written into the respective vacant areas as shown in FIGS. 21A and 21B. The data #1, #8 and #12 written in the drive #1 are the original data. The duplexed data for those original data are stored in the (cylinder #1, track #4) of the drive #2 for the data #1, the (cylinder #3, track #4) of the drive #3 for the data #8 and the (cylinder #4, track #4) of the drive #4 for the data #12, respectively, in accordance with the storing rule of the Embodiment 1. Since those data #1, #8 and #12 are sequential data, when the data #1, #8 and #12 are to be read sequentially, the duplexed data #1, #8 and #12 are parallelly read from the drives #2, #3 and #4, respectively. As shown in the timing chart of FIG. 21, when the original data #1, #8 and #12 are sequentially read from the drive #1, the seek of the head for the respective data, the rotation waiting time and the transfer of the data are needed. When the duplexed data are parallelly read from the plurality of drives as described above, the seek of the head, the rotation waiting time and the transfer of the data are required only one time for each drive. While the unit of data is track in the above description, the data smaller than the capacity of the track may be used as the unit. For example where one track includes ten data, it is assumed that the original data of the data #1, #8 and #12 are stored in the tracks of (cylinder #1, track #1), (cylinder #3, track #2) and (cylinder #4, track #3). The duplexed data thereof may be stored in the (cylinder #1, track #4) of the drive #2, the (cylinder #3, track #4) of the drive #3 and the (cylinder #4, track #4) of the drive #4, respectively.

In the above embodiments, the magnetic disk drive is used as the drive 4 although it may be an optical disk dive or a floppy disk drive. Further, while the logical group 5 consists of four drives, the number of drives 4 in the logical group 5 is not restricted so long as it is two or larger.

In the above embodiments, the DCU 7 is provided in the DKC 2 to totally control the drives 4 in the DU 3 although the DCU 7 may be provided for each logical group 5. Where the DCU 7 is provided for each logical group 5, the CPU 1 recognizes the logical group 5 in which the corresponding data is stored as one large data space and can issue a read/write request thereto. In the logical group 5, the DCU 7 finds a physical address at which the data specified by the CPU 1 is stored and performs the read/write process to the corresponding drive 4. Alternatively, the OS of the CPU 1 may support the function of the DCU 7.

The duplex disk array system of the present invention may coexist with the prior art mirror system, the RAID3 or the RAID5. Where a logical group 5 by a plurality of storing systems is present in one system, the storing system may be selected depending on the data characteristic such as the demand for the data reliability and the request for the high speed transfer.

In accordance with the present invention, since the data is distributedly stored in the drives of the disk array, the drives may be efficiently used and the data may be read or written at a high speed without reducing the number of data processed per unit time. As for the data recovery process in case a fault occurs in the drive, the duplexed data are parallelly read to recover the data in a short time. Even when the recovery process and the on-line process are carried out parallelly, the interruption time to stop the of the on-line process is short and the impact to the user is minimized.

We claim:

1. A disk array comprising:
   (a) a plurality (m; m>3) of disk drives; and
   (b) a disk control unit for controlling writing of data to said disk drives and reading of data from said disk drives;

said disk control unit including;
   (b1) determining means for determining a plurality of area pairs each including an area for original data and an area for duplexed data of the original data, among a plurality of areas included in said plurality of disk drives, said area pairs being determined such that an area for original data and an area for duplexed data both belonging to a same area pair are located in different respective disk drives, and such that of a set of n area pairs (where 2≦n≦m−1) which have their areas for original data on a common disk drive, the corresponding areas for duplexed data are distributed in one-to-one correspondence across each of n other drives;

(b2) means for writing data to be written into said plurality of disk drives both into one area for original data and another area for duplexed data belonging to a same one area pair among said plurality of area pairs as determined, respectively;

(b3) means for selecting data read areas each constituted by a plurality of areas which are stored on different disk drives and which hold either the original data or the duplexed data of different area pairs to be read from said plurality of disk drives, said plurality of data being greater than two; and (b4) means for reading in parallel the plurality of data from the plurality of detected areas.

2. A disk array according to claim 1, wherein a number of the plurality of data to be read is one larger than said predetermined number (n).

3. A disk array according to claim 1, wherein said predetermined number (n) is equal to m−1.

4. A disk array according to claim 3, wherein a number of the plurality of data to be read is equal to m.

5. A disk array according to claim 4, wherein said means for determining the area pairs includes:

means for selecting a plurality of area groups each including 2m(m−1) areas included by 2(m−1) in each of said plurality of disk drives, among the plurality of areas included in said plurality of disk drives, wherein said determining means determines said plurality of area pairs such that each of m−1 areas in a respective one of the disk drives included in each area group is paired with one of a first group of areas having m−1 areas included in a different one of m−1 disk drives other than said respective disk drive to which said each of m−1 areas belongs, and such that each other of said m−1 areas in each of the disk drives included in said area group is paired with one of a second group of areas having m−1 different areas not belonging to said first group of areas and included in different ones of said m−1 disk drives other than said respective disk drive.

6. A disk array according to claim 4, wherein said means for determining the area pairs includes;

means for selecting a plurality of area groups each including m(m−1) areas included by (m−1) in each of said plurality of disk drives, among the plurality of areas included in said plurality of disk drives, wherein said determining means determines said plurality of area pairs such that each of m−1 areas in each of the disk drives included in each area group is paired with one of m−1 areas included in different ones of m−1 disk drives other than said respective disk drive.

7. A disk array according to claim 1, wherein m is no smaller than 4 and n is smaller than m−1 and no smaller than 2.

8. A disk array according to claim 7, wherein a number of the plurality of data to be read is one larger than said predetermined number (n).

9. A disk array according to claim 7, wherein;

m is equal to 2k (where k≧2), and said means for determining the area pairs includes:

means for dividing the plurality of areas of each of said plurality of disk drives into k areas each having 1/k-th of the plurality of areas, and means for determining k area groups which correspond to k area groups of each of a first set of k disk drives selected from said plurality of disk drives, and which belong to different ones of a second set of k disk drives other than said selected first set of k disk drives, wherein said determining means determines said plurality of area pairs such that a plurality of areas in each area group of each of said selected first set of k disk drives are paired with an area belonging to one area group corresponding to said each area group among the area groups within the second set of k disk drives.

10. A disk array according to claim 1, wherein said disk control unit further includes means for allocating area pairs, determined by said determining means, to respective logical addresses specified by a host device, the plurality of data to be read are data having a plurality of logical addresses specified by a plurality of read requests issued from said host device, and said detecting means for the data read areas includes:

means responsive to the plurality of read requests issued from said host device for detecting area pairs allocated by said allocating means for said logical addresses specified by said plurality of read requests, wherein said means for detecting detects, as said data read areas, a plurality of said areas for original data or duplexed data, belonging to different ones of the plurality of detected area pairs and belonging to different disk drives.

11. A disk array according to claim 1, wherein said disk control unit further includes means for allocating plural area pairs among the plurality of determined area pairs to a logical address specified by a host device, and said detecting means for the data read area includes:

means responsive to one read request issued from said host device for detecting area pairs allocated by said allocating means for the logical address specified by said read request, wherein said means for detecting detects, as said read areas, a plurality of said areas either for original data or for duplexed data, belonging to different ones of the plurality of detected area pairs and belonging to different disk drives.

12. A disk array according to claim 1, wherein the plurality of data to be read are all stored in one of said plurality of disk drives.

13. A disk array according to claim 12, wherein a number of the plurality of data to be read is one larger than said predetermined number (n).

14. A disk array according to claim 12, wherein said predetermined number (n) is equal to m−1 and the number of the plurality of data to be read is equal to m.

15. A disk array according to claim 1, wherein said determining means determines areas so that an address of an area for original data differs from an address of an area for duplexed data in a respective area paid.

16. A disk array according to claim 1, wherein said determining means determines areas so that a track address of an area for original data differs from a track address of an area for duplexed data in a respective area pair.

17. A disk array according to claim 1, wherein said determining means determines areas so that a cylinder address of an area for original data differs from a cylinder address of an area for duplexed data in a respective area pair.

18. A disk array according to claim 1, wherein said determining means determines areas so that, with respect to each data in a logical group constituted by a plurality of continuous data, areas for original data are continuous in a disk drive, and areas for duplexed data are distributed on average to a plurality of disk drives other than the disk drive that stores corresponding original data.

19. A disk array comprising:

(a) a plurality (m; m>3) of disk drives; and (b) a disk control unit for controlling writing of data to said disk drives and reading of data from said disk drives;

said disk control unit including;

(b1) means for determining a first plurality of area pairs each including an area for original data and an area for duplexed data of the original data, among a plurality of areas included in said plurality of disk drives, said area pairs being determined such that an area for original data and an area for duplexed data both belonging to a same area pair are located in different respective disk drives, and such that of a set of n area pairs (where $2 \leq n \leq m-1$) which have their areas for original data on a common disk drive, the corresponding areas for duplexed data are distributed in one-to-one correspondence across each of n other drives;

(b2) means for writing data to be written into said plurality of disk drives both into one area for original data and another area for duplexed data belonging to a same one area pair among said plurality of area pairs as determined, respectively;

(b3) means for determining a second plurality of area pairs each including one of a plurality of areas included in one of said plurality of disk drives as an area for original data or for duplexed data, when a fault occurs in said one disk drive;

(b4) means for determining a third plurality of areas included in different ones of the plurality of determined area pairs and belonging to different ones of said plurality of disk drives other than said one disk drive;

(b5) means for reading in parallel a plurality of data stored in the plurality of determined areas; and (b6) means for serially writing the plurality of read data to an alternative disk drive to be used in place of said one disk drive.

20. A disk array according to claim 19, wherein said predetermined number (n) is equal to m−1 and a number of the determined areas is equal to m.

21. A disk array according to claim 19, wherein said determining means determines areas so that an address of an area for original data differs from an address of an area for duplexed data in a respective area paid.

22. A disk array according to claim 19, wherein said determining means determines areas so that a track address of an area for original data differs from a track address of an area for duplexed data in a respective area pair.

23. A disk array according to claim 19, wherein said determining means determines areas so that a cylinder address of an area for original data differs from a cylinder address of an area for duplexed data in a respective area pair.

24. A disk array according to claim 19, wherein said determining means determines areas so that, with respect to each data in a logical group constituted by a plurality of continuous data, areas for original data are continuous in a disk drive, and areas for duplexed data are distributed on average to a plurality of disk drives other than the disk drive that stores corresponding original data.

25. A disk array comprising:

(a) a plurality (m; m>3) of disk drives; and (b) a disk control unit for controlling writing of data to said disk drives and reading of data from said disk drives;

(b1) means for determining a first plurality of area pairs each including an area for original data and an area for duplexed data of the original data, among a plurality of areas included in said plurality of disk drives, said area pairs being determined such that an area for original data and an area for duplexed data both belonging to a same area pair are located in different respective disk drives, and such that of a set of n area pairs (where $2 \leq n \leq m-1$) which have their areas for original data on a common disk drive, the corresponding areas for duplexed data are distributed in one-to-one correspondence across each of n other drives;

(b2) means for allocating plural ones of the plurality of determined area pairs to a logical address specified by a host device;

(b3) means for writing data to be written into said plurality of disk drives into one area for original data and another area for duplexed data both belonging to one of the plurality of area pairs as determined;

(b4) means for determining a second plurality of area pairs each including one of a plurality of areas included in one of said plurality of disk drives as an area for original data or for duplexed data, when a fault occurs in said one disk drive;

(b5) means for determining a third plurality of areas included in different ones of the plurality of determined area pairs and belonging to different ones of said disk drives other than said one disk drive;

(b6) means for sequentially reading a plurality of data stored in the plurality of determined areas;

(b7) means for sequentially writing the plurality of read data into an alternative disk drive to be used in place of said one disk drive;

(b8) means responsive to a data read request issued from a host device after occurrence of the fault for selecting an area belonging to one of said other disk drives, among an area for original data and another area for duplexed data both belonging to an area pair allocated to a logical address specified by the read request to said allocating means; and (b9) means for reading data from the selected area in parallel to writing of the plurality of data into said alternative disk drive by said data writing means.

26. A disk array according to claim 25, wherein said predetermined number (n) is equal to m−1 and a number of the determined areas is equal to m.

27. A disk array according to claim 25, wherein said determining means determines areas so that an address of an area for original data differs from an address of an area for duplexed data in a respective area paid.

28. A disk array according to claim 25, wherein said determining means determines areas so that a track address of an area for original data differs from a track address of an area for duplexed data in a respective area pair.

29. A disk array according to claim 25, wherein said determining means determines areas so that a cylinder address of an area for original data differs from a cylinder address of an area for duplexed data in a respective area pair.

30. A disk array according to claim 25, wherein said determining means determines areas so that, with respect to each data in a logical group constituted by a plurality of continuous data, areas for original data are continuous in a disk drive, and areas for duplexed data are distributed on average to a plurality of disk drives other than the disk drive that stores corresponding original data.

31. A disk array comprising:

(a) a plurality (m; m>3) of disk drives; and (b) a disk control unit for controlling writing of data to said disk drives and reading of data from said disk drives;

said disk control unit including:

(b1) means for determining a plurality of area pairs each including an area for original data and an area for duplexed data of the original data, among a plurality of areas included in said plurality of disk drives, said area pairs being determined such that an area for original data and an area for duplexed data both belonging to a same area pair are located in different respective disk drives, and such that of a set of n area pairs (where $2 \leq n \leq m-1$) which have their areas for original data on a common disk drive, the corresponding areas for duplexed data are distributed in one-to-one correspondence across each of n other drives;

(b2) means for writing data to be written into said plurality of disk drives both into a first area for original data and a second area for duplexed data belonging to a common area pair among said plurality of area pairs as determined, respectively;

(b3) means for detecting a pair of said plurality of areas each holding data to be read from said plurality of disk drives as original data or duplexed data; and (b4) means for reading the data from one area of the detected pair of areas.

32. A disk array according to claim 31, wherein said determining means determines areas so that an address of an area for original data differs from an address of an area for duplexed data in a respective area paid.

33. A disk array according to claim 31, wherein said determining means determines areas so that a track address of an area for original data differs from a track address of an area for duplexed data in a respective area pair.

34. A disk array according to claim 31, wherein said determining means determines areas so that a cylinder address of an area for original data differs from a cylinder address of an area for duplexed data in a respective area pair.

35. A disk array according to claim 31, wherein said determining means determines areas so that, with respect to each data in a logical group constituted by a plurality of continuous data, areas for original data are continuous in a disk drive, and areas for duplexed data are distributed on average to a plurality of disk drives other than the disk drive that stores corresponding original data.

* * * * *